US005499178A

United States Patent [19]
Mohan

[11] Patent Number: 5,499,178
[45] Date of Patent: Mar. 12, 1996

[54] SYSTEM FOR REDUCING HARMONICS BY HARMONIC CURRENT INJECTION

[75] Inventor: Ned Mohan, St. Paul, Minn.

[73] Assignee: Regents of The University of Minnesota, Minneapolis, Minn.

[21] Appl. No.: 194,701

[22] Filed: Feb. 10, 1994

Related U.S. Application Data

[63] Continuation-in-part of Ser. No. 17,682, Feb. 12, 1993, abandoned, which is a continuation-in-part of Ser. No. 807,717, Dec. 16, 1991, Pat. No. 5,345,375.

[51] Int. Cl.$^6$ .................................................. H02M 1/12
[52] U.S. Cl. .............................. 363/39; 363/40; 363/44; 363/84; 363/95; 307/105
[58] Field of Search ............................ 307/105; 363/39, 363/40, 41, 44, 84, 87, 89, 95, 96, 98, 129, 132, 137

[56] References Cited

U.S. PATENT DOCUMENTS

| | | | |
|---|---|---|---|
| 3,979,662 | 9/1976 | Klein | 363/41 |
| 4,053,820 | 10/1977 | Peterson et al. | 363/44 |
| 4,184,197 | 1/1980 | Cuk et al. | 363/16 |
| 4,204,264 | 5/1980 | Lipman | 363/40 |
| 4,224,660 | 9/1980 | Mohan | 363/48 |
| 4,730,243 | 3/1988 | Glennon | 363/44 |
| 4,967,334 | 10/1990 | Cook et al. | 363/44 |
| 4,975,822 | 12/1990 | Lipman | 363/40 |
| 5,345,375 | 9/1994 | Mohan | 363/44 |

FOREIGN PATENT DOCUMENTS

| | | | |
|---|---|---|---|
| 3-86022 | 11/1991 | Japan | H02J 3/01 |
| 1252572 | 11/1971 | United Kingdom | H02M 1/12 |

OTHER PUBLICATIONS

"New Rectifier Circuits with Low Mains Pollution and Additional Low Cost Invertor for Energy Recover," Clemens Niermann et al, pp. 1131–1136, Aachen, Germany, Dec. 1989.
"Harmonic Reduction in Multiplex Converters by Triple–Frequency Current Injection," B. M. Bird et al., *Proceedings of IEEE*, vol. 116, No. 10, Oct. 1969, pp. 1730–1734.
"Generalized Method of Harmonic Reduction in A.C.=D.C. Convertors by Harmonic Current Injection," A. Ametani, *Proceedings of IEEE*, vol., 199, No. 7, Jul. 1972, pp. 857–864.
"Description and Prospective Applications of New Multi–Terminal HVDC System Concepts," L. Knudsen et al., pub. by Cigna, 112, Boulevard Haussmann, 75008 Paris, France, No. 14–201, 26 Aug.–Sep. 1990.
"Advances in Switched–Mode Power Conversion," Cuk and Middlebrook, *Telasco Power Electronics Series*, vol. II, Jun. 1981.
Selected pages from *IEEE Transactions on Industrial Electronics*, vol. 37, No. (Aug. 1990).
Selected pages from *Power Electronics*, Ned Mohan et al., published by John Wiley & Sons (Dec. 1989).
"Harmonic Reduction in Thyriston Converts by Harmonic Current Injection," A. Ametani, *IEEE Transactions on Power Apparatus and Systems*, vol. PAS–95, No. 2, Mar./Apr. 1976, pp. 441–449.
"Harmonic Reduction in D.C.–Ripple Reinjection," J. F. Baird et al., *IEEE Proceedings*, vol. 127, Pt. C., No. 5, Sep. 1980, pp. 294–303.
"Increasing the Pulse Number of AC–DC Convertors by Current Reinjection Techniques," J. Arrillaga et al., *IEEE Transactions on Power Apparatus and Systems*, vol. PAS–102, No. 8, Aug. 1983, pp. 2649–2655.

*Primary Examiner*—Jeffrey L. Sterrett
*Attorney, Agent, or Firm*—Westman, Champlin & Kelly

[57] ABSTRACT

A circuit is provided for generating a current that is a harmonic of the frequency of the utility system and which is of a selected amplitude and phase to reduce the total harmonic distortion of a system that converts alternating current to direct current, or vice versa. The DC signal is sampled and by controlling switches, a sinusoidal current at the desired harmonic is generated, and is provided to a neutral of a transformer that injects this current into the multiphase AC system used by the utility in a very low cost, easily controlled, and highly effective manner. In a second embodiment, the injection current is provided to a common junction of a magnetic device.

22 Claims, 21 Drawing Sheets

SYSTEM FOR REDUCING HARMONICS BY HARMONIC CURRENT INJECTION

CROSS REFERENCE TO RELATED APPLICATION

This application is a continuation-in-part of application Ser. No. 08/017,682, filed Feb. 12, 1993, now abandoned, which was a continuation-in-part of application Ser. No. 07/807,717, filed Dec. 16, 1991, now U.S. Pat. No. 5,345, 375.

BACKGROUND OF THE INVENTION

The present invention relates to a system for reducing harmonic currents in an electric power conversion system where three-phase alternating current (AC) power is converted to direct current (DC) power and vice versa, and, more particularly, to a system that modulates current on the DC portion of the conversion system to create a selected harmonic current that is injected into the AC portion of the conversion system.

Converter systems and inverter systems are used throughout electric utility power systems to transfer power from and to the utility system grid, respectively. Converter systems transform alternating current power from the utility system to direct current power as a front end in loads such as uninterruptable power supplies (UPS), adjustable speed drives, induction heaters and arc welders. In contrast, inverter systems transform direct current power provided from renewable energy sources such as wind, photovoltaic or small hydro-powered generating systems to alternating current power that is provided to the electric utility system. In other energy storage systems such as batteries and magnetic storage, a combination of a converter and an inverter allows power to flow bidirectionally rather than unidirectionally.

However, as is commonly known, each of the aforementioned converter and inverter systems also contribute harmonic currents into the utility system grid. These harmonic currents may distort the generated voltage waveform at the point of common coupling with the power conversion system due to the finite system impedance of the utility system grid. In addition to voltage waveform distortion, harmonic currents interfere with communication and control signals, cause economic losses due to errors in metering and malfunctioning of utility system protection relays and stress the utility system equipment from heat generated by the harmonic currents and over-voltage conditions that occur in resonant situations.

Due to the increased use of converter and inverter conversion systems, and the inherent problems associated with the harmonic currents that they produce, national and international agencies have established various standards and guidelines to specify allowable limits for harmonic currents on a system. Some of these standards include: EN 50 006, "The Limitation of Disturbances in Electricity Supply Networks Caused by Domestic and Similar Appliances Equipped with Electronic Devices," European standard prepared by Comité Européen de Normalisation Electrotechnique, CENELEC; IEC Norm 555-3, prepared by the International Electrical Commission and IEEE "Guide for Harmonic Control and Reactive Compensation of Static Power Converters", ANSI/IEEE standard 519–1981, which is expected to be revised.

For example, the revised IEEE-519 standard will contain recommended practices and requirements for harmonic control in the electric power system by specifying restrictions on the power conversion user as well as on the utility. Specifically, this standard will include upper limits on the amount of harmonic currents that a power conversion system user may inject into the utility system, and will provide voltage quality requirements upon the utility, provided that the harmonic currents injected by the user are within the specified limits.

In view of the standards imposed, various techniques have been implemented to reduce the harmonic currents present onto the utility power system. These techniques include passive filtration, active filtration and current wave shaping systems. In passive filtration, a fixed filter is connected to the utility system at the point of common coupling. The passive filter provides a low impedance path for the generated harmonic currents, thus bypassing them from entering the utility system. Significant drawbacks are present with this filtering technique. For example, since the passive filter is in parallel with the utility system impedance, a resonance condition may result that could cause an over-voltage condition at the point of common coupling. In addition, besides "shunting" or "sinking" harmonic currents generated from the power conversion system, the passive filter further sinks harmonic currents generated elsewhere in the utility system. Consequently, the power ratings of the passive filter components must be increased to handle the additional load requirements. These high power components raise the cost of the filter.

Active filters are also connected to the alternating current power utility system when they are used. When active filters are used, harmonic currents generated by the power conversion system (from AC-DC or reverse) are measured on the utility system. The active filter includes a switch-mode power electronics converter that supplies the harmonic currents drawn by the power conversion system so they are not emanating from the utility system. However, since the harmonic currents can be almost as large in magnitude as the fundamental frequency current, the power rating of the active filter approaches that of the power conversion system thereby making this filtering technique quite expensive to implement.

As opposed to the passive or active filtering techniques discussed above, which compensate for harmonic currents by either shunting or supplying the harmonic currents, respectively, the wave shaping technique attempts to draw from the utility system a current that is sinusoidal at the fundamental frequency (60 Hz in the U.S.). Commonly, this technique includes a switch-mode interface consisting of six control switches such as power transistors or gate-turn-off thyristors (GTO), each with a diode in antiparallel. This is a bidirectional current (power) interface, and permits the line currents drawn from or supplied to the utility system to be actively shaped to be sinusoidal. In addition, as opposed to the passive and active filters discussed above, this type of power conversion interface allows the DC voltage on the DC power system to be regulated at any desired value (greater than the peak line to line voltage). However, due to the sixswitch topology of this interface, and since power flow is typically only in one direction, that is, the switch mode interface is either functioning as a converter or an inverter, this type of interface is considered too expensive to implement.

Modulation of the currents on the DC side, at a harmonic frequency, and injecting the modulated current back into the AC side has been demonstrated in the prior art. However, in the prior art, separate sources for generating the harmonic current are used, and they do not use the direct current. In order to obtain a pure DC current, the prior art devices need large, costly inductors in the DC system, and they require an isolation transformer between the utility system and the DC system for operation and injection of the current which also raises the cost.

Examples of two types of systems that provide a harmonic distortion reduction using injection of a harmonic current are the A. Ametani, entitled "Generalized Method of Harmonic Reduction AC-DC Converters by Harmonic Current Injection", Proc. IEE Vol. 119, No. 7, July 1972, pages 857–864, and an article by B. M. Bird, J. F. Marsh and P. R. McLellan entitled "Harmonic Reduction in Multiplex Convertors by Triple-Frequency Current Injection" Proc. IEE, Vol. 116, No. 10, October 1969, pages 1730–1734.

In the Ametani article, current sources are used as shown in FIG. 2 for generating the harmonic current and in Section 3.1, FIG. 9, schematic representations of the applications are shown. In each instance, a separate source for generating the harmonic current that is injected is provided.

An injection of a harmonic current is also shown in the Bird et. al. reference, and here, too, a separate current source for generating the harmonic current is used. The prior art systems do not provide a controlled or regulated DC output, as does the present device, and the prior art devices required transformers for injection of the current for reducing harmonic distortion.

In the prior art, for the generation of harmonic currents a 4-quadrant converter will be required whose output voltage as well as current is alternating at the harmonic frequency. In the present device, the function of harmonic current generation is combined with the DC output regulation. As a consequence, only one quadrant converters are needed, whose output voltage and current both are DC, and always one polarity.

SUMMARY OF THE INVENTION

The present invention relates to a sinusoidal current interface for a three-phase utility system to reduce the total harmonic distortion caused by converting AC power to DC power and vice versa, by modulating the current outputs of the rectifier at a desired harmonic of the base frequency and applying these as currents to be injected into the AC side of the utility system through an impedance network, such as a set of series connected inductor and capacitor branch, wherein each branch is connected to a line of the three-phase system.

The modulation of the DC system current by a third harmonic current and simultaneous injection of the third harmonic current, which is synchronized and in phase with the AC system and which is at a desired controlled level, will reduce the total harmonic distortion of the utility system currents. Depending on whether used with a converter system or an inverter system, the third harmonic current can be obtained by modulating the DC side current at the desired frequency, phase, and amplitude with step-up (boost) converters or step-down (buck) converters, respectively. The converter system provides a regulated DC output voltage.

If electrical isolation is desired, converters having high frequency isolation transformers can be incorporated into boost or buck-derived converters. A 60 Hz isolation transformer can, of course, always be used.

The system also can be used for reducing harmonic distortions when renewable energy sources, such as wind generators, solar cells, small hydroplants, or fuel cells are used to generate DC voltages. The DC voltage is obtained directly in the case of solar cells and by rectification of variable frequency AC in wind generators and small hydro plants. The generated energy is fed back into a three-phase utility system. Two step-down converters and a thyristor inverter are preferably used to interface the generated DC voltages with a three-phase utility grid, because the harmonic distortions can be reduced substantially. The inverter as shown uses line-commutated thyristors or, for enhanced control, uses gate turn-off thyristors. The step-down converters provide regulated power flow back to the utility system at a desired value.

The injection of the harmonic current into each line of the three-phase system is through an impedance network, as shown. When a series connected inductor and capacitor are used, as shown, proper tuning will avoid resonance. The disclosed impedance network of series connected capacitor and inductor can be made into a high pass filter and used for injection of current by connecting a resistor in parallel across the inductor. A pure, large capacitor can also be used as the impedance network, if desired. High energy efficiency is achieved at low cost, with low power losses and low electromagnetic interference.

The present system can be used either with a 6-pulse topology or a 12-pulse topology as will be disclosed. The system of the present invention results in a slightly leading power factor at the line frequency, which is desirable. The present invention also has the advantage of permitting use of some of the older, known methods of reducing harmonics, such as the use of active filters, where greater harmonic reduction is desired.

The system has quite wide application in switch mode power supplies, interuptable power supplies, adjustable speed drives, battery chargers, and industrial use such as induction heating, arc welding, and electroplating.

The ability to use the present invention with bidirectional power flow as an interface with electric storage sources such as batteries, fuel cells, or superconductive applications, gives wide utility.

DETAILED DESCRIPTION OF THE PREFERRED EMBODIMENTS

Figure 1:
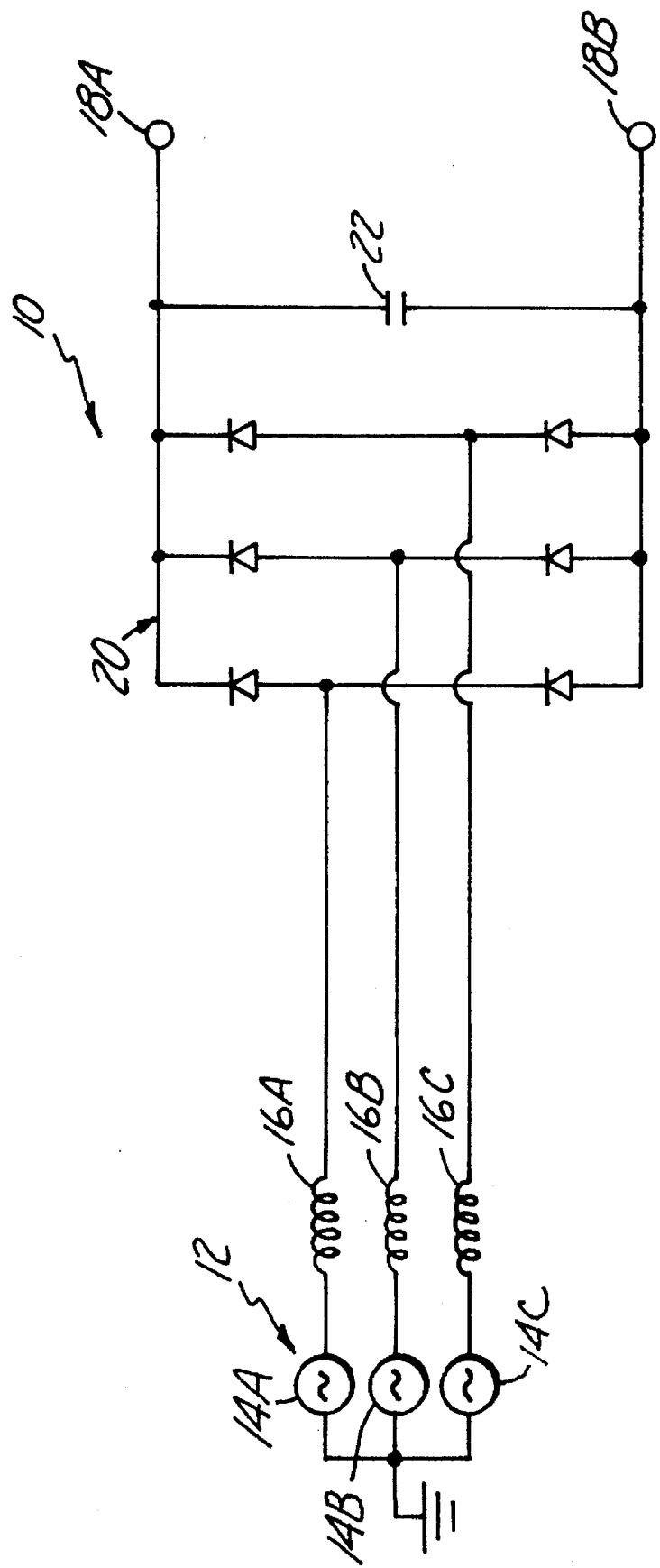
FIG. 1 is a three-phase alternating current to direct current power conversion system shown for illustrative purposes.

FIG. 1 illustrates a simplified three-phase alternating current to direct current power conversion system 10. System 10 converts power from a three-phase source 12, which comprises three single-phase voltage sources 14A, 14B and 14C connected in a standard wye or star configuration. Each phase includes internal inductance 16A, 16B and 16C. Direct current power is provided at terminals 18A and 18B. Power conversion system 10 includes a conventional three-phase, six-pulse full-bridge diode rectifier 20. A large filter capacitor 22 is connected across terminals 18A and 18B to provide a substantially ripple free, unregulated but constant DC output voltage. Although the system of FIG. 1 converts three-phase alternating current power to direct current power, disadvantages of this system exist. First, the DC voltage appearing across terminals 18A and 18B is unregulated in that the voltage magnitude is dependent upon the line to line voltages from three-phase source 12. In addition, as is conventionally known, rectification as illustrated in FIG. 1, draws non-sinusoidal line currents from three-phase source 12 and harmonic current distortions occur. Through Fourier spectrum analysis, each of the harmonic components of the input line currents (on lines 16A, 16B and 16C) can be calculated. Table 1 below provides a partial tabulation of the 5th, 7th, 11th and 13th magnitude values as a fraction of the base fundamental frequency.

TABLE 1

| Line-Current Distortion | |
|---|---|
| Harmonic Number | Fraction of Fundamental |
| 1 | 1.00 |
| 5 | 0.67 |
| 7 | 0.44 |
| 11 | 0.09 |
| 13 | 0.06 |
| . | . |
| . | . |

Using the standard definition for Total Harmonic Distortion (THD) as given by $$\% THD = 100 \times \sqrt{\sum_{h=2}^{\infty} I_h^2/I_1^2}$$

where $I_1$ equals the magnitude of the base fundamental frequency and $I_h$ equals the magnitude for each of the harmonic frequencies, it can be shown for the first four harmonics provided in Table 1 that the total harmonic distortion exceeds 80%.

Figure 2:
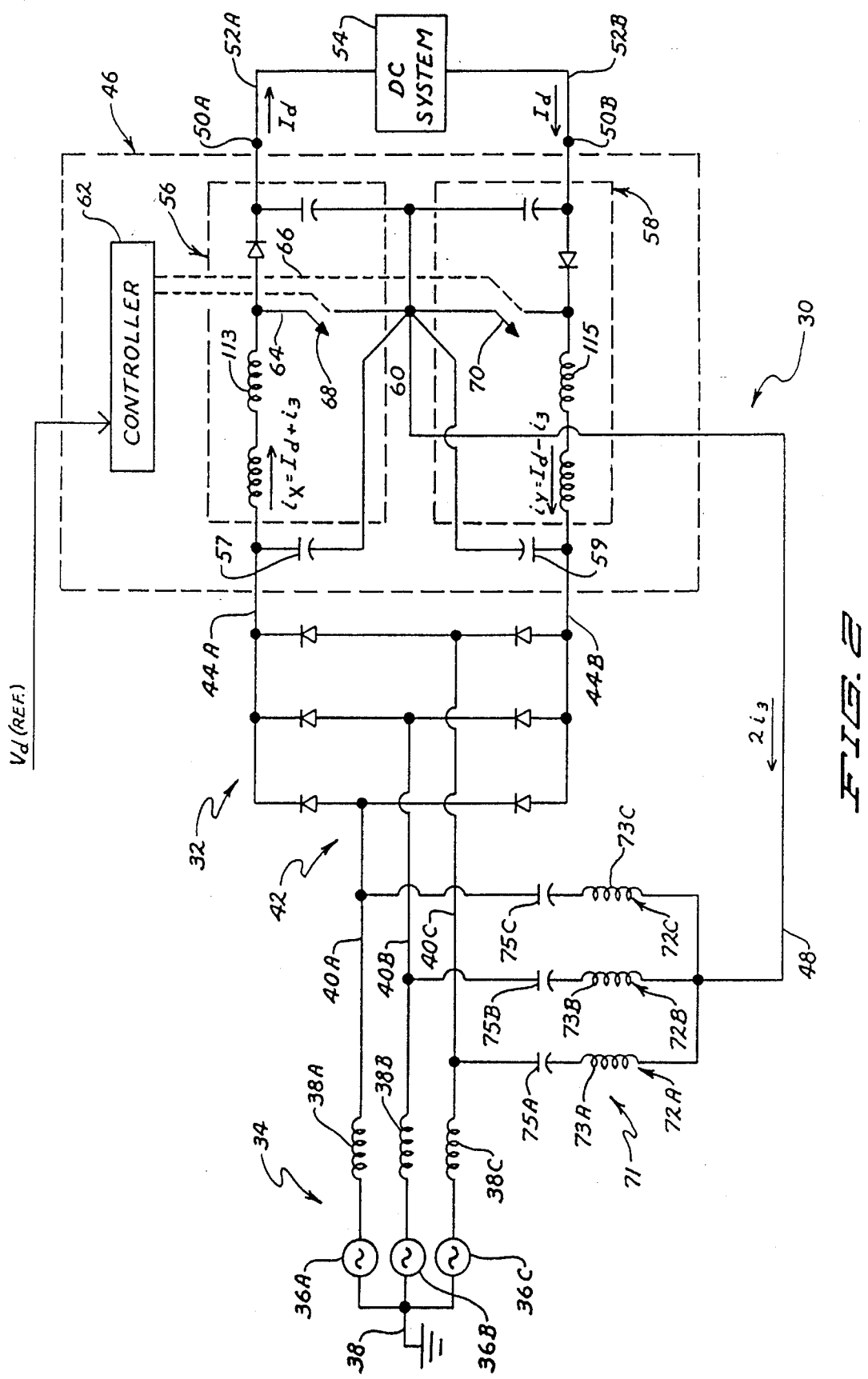
FIG. 2 is a schematic representation of a preferred embodiment of the present invention as applied to reducing harmonic distortion between a utility system and a DC system.

Referring now to FIG. 2, a harmonic reducing system or circuit 30 is shown as part of an AC to DC power conversion system 32. In this figure, a utility system grid has been simplified and modeled as an equivalent three-phase source 34. Three-phase source 34 is modeled as three single-phase ideal AC voltage sources 36A, 36B and 36C connected conventionally in a wye or star arrangement with a common or neutral point 38 which could also be an ungrounded source or connected in a delta arrangement. At an end opposite from neutral point 38, each voltage source 36A, 36B and 36C is connected to an inductor 38A, 38B and 38C which are used to model the utility system equivalent impedance, plus any inductance inserted intentionally to reduce harmonic distortion at the source. Inasmuch as the inductance dominates in the electric utility system, the equivalent utility system impedance resistance has been neglected.

Inductors 38A, 38B and 38C are connected with lines 40A, 40B and 40C to a conventional three-phase, six-pulse, full-bridge diode rectifier 42. Rectified unregulated output voltages from rectifier 42 are provided on lines 44A and 44B.

As shown, a harmonic current reducing system or circuit 30 is connected to rectifier 42 at output lines 44A and 44B. Harmonic current reducing system 30 includes a current generator or modulator denoted generally at 46 (which provides a regulated DC output voltage) and a harmonic injection current feedback path 48. Harmonic current reducing system 30 together with rectifier 42, functioning as power conversion system 32, reduces the harmonic components present in the line currents drawn from the utility system 34 on lines 40A, 40B and 40C by injecting a phase-synchronized third harmonic frequency current of appropriate and controlled magnitude through feedback path 48 in the manner described below. In addition, harmonic current reducing system 30 provides a substantially constant regulated DC output voltage across output terminals 50A and 50B. Lines 52A and 52B connect a DC system denoted generally at 54 to power conversion system 32. DC system 54 typically is part of switch-mode power supplies, uninterruptable power supplies, adjustable speed drives, battery chargers or the like, or maybe part of an industrial process that include induction heating, arc welding or electroplating.

Modulator 46 includes two step-up or "boost" converters 56 and 58. As shown, step-up converters 56 and 58 are connected in series through a junction point 60 across terminals 50A and 50B. A controller 62 provides control signals along signal lines 64 and 66 to operate controllable high frequency switches 68 and 70, respectively, of step-up converters 56 and 58, respectively. Two small capacitors 57 and 59 are included to provide a path for high-switching frequency current ripples. Alternatively, these can be placed across the branches of an impedance network shown at 71.

High frequency switches 68 and 70, may be any of a number of well known switches, such as Insulated Gate Bipolar Transistors (IGBTs) or Gate Turn off Thyristors (GTOs). GTO's, which are used in the preferred embodiment work similar to normal thyristors, except GTO's have the capability of being turned off by applying a large negative current flow to the gate.

For protection purposes, diodes may be placed across any of the switches in any of the embodiments in a direction antiparallel to the switches. This protects from reverse voltages damaging the switches. Placing diodes in this way for protection purposes is common to people skilled in the art.

Current feedback path or line 48 is connected to modulator 46 at junction point 60. Current feedback line 48 is also connected to an impedance network 71, which is used for injecting current into the AC system. Impedance network 71 comprises three substantially identical impedance branches 72A, 72B and 72C, each of which is connected to a corresponding line 40A, 40B and 40C of the three-phase system. The impedance branches 72A, 72B, 72C each include series connected inductors 73A, 73B and 73C and capacitors 75A, 75B and 75C. The branches can be made into high pass filters for each phase of the AC system as well by connecting resistances in parallel with the inductors. These filters are tuned near a selected frequency related to the fundamental frequency. The impedances of branches 72A, 72B and 72C should be as near identical as possible. The impedance branches of network 71 can be designed to provide reactive power (vars) at line frequency to supply the reactive power requirements of the system which results in a leading power factor, which is desirable.

Controller 62 uses known techniques for controlling switches 68 and 70 of step-up converters 56 and 58, respectively, at a desired frequency to provide a desired DC current, $I_d$, to DC system 54 and a third harmonic frequency injection current, $i_3$, that is proportional to the load current $I_d$. Each of the third harmonic frequency injection currents $i_3$ in lines 44A and 44B is generated by step-up converters 56 and 58 and combined at junction point 60 to form a third harmonic frequency injection current $2i_3$, that is provided to impedance network 71 along feedback current path 48. In order to provide the third harmonic current $i_3$ to junction point 60 and the load current $I_d$ to DC system 54, controller 62 operates step-up converter 56 to draw from rectifier 42 a current, $i_x$ equal to the load current and the third harmonic current as represented by the following equation.

$$i_x = (I_d + i_3)$$

In like fashion, controller 62 operates step-up converter 58 to provide a current, $i_y$, to rectifier 42 through line 44B. The provided current $i_y$ is equal to the load current and the third harmonic current as given by the following equation.

$$i_y = (I_d - i_3)$$

Figure 3:
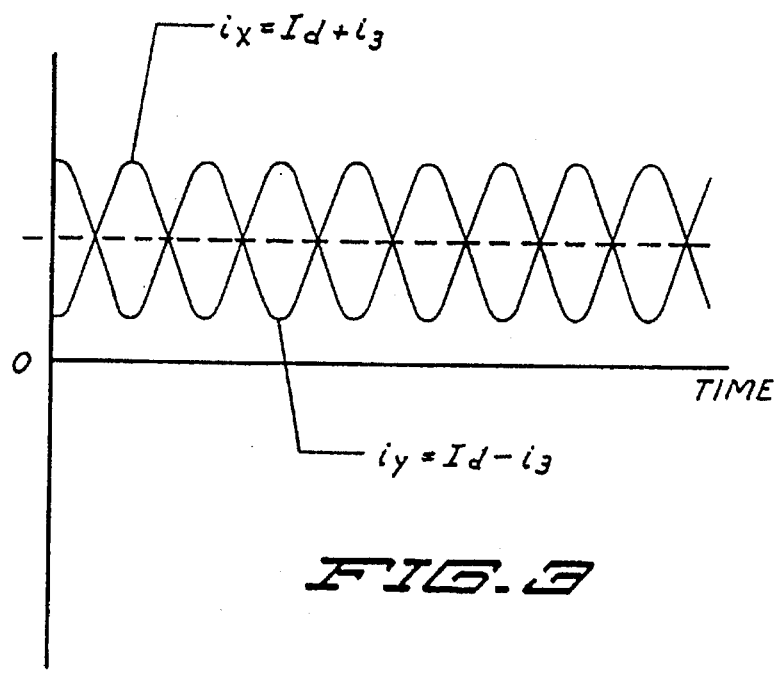
FIG. 3 is a plot of currents generated for modulation of the DC system currents and for providing the reinjection of harmonic current in the arrangement shown in FIG. 2.

For illustrative purposes only, FIG. 3 shows currents $i_x$ and $i_y$.

Figure 5:
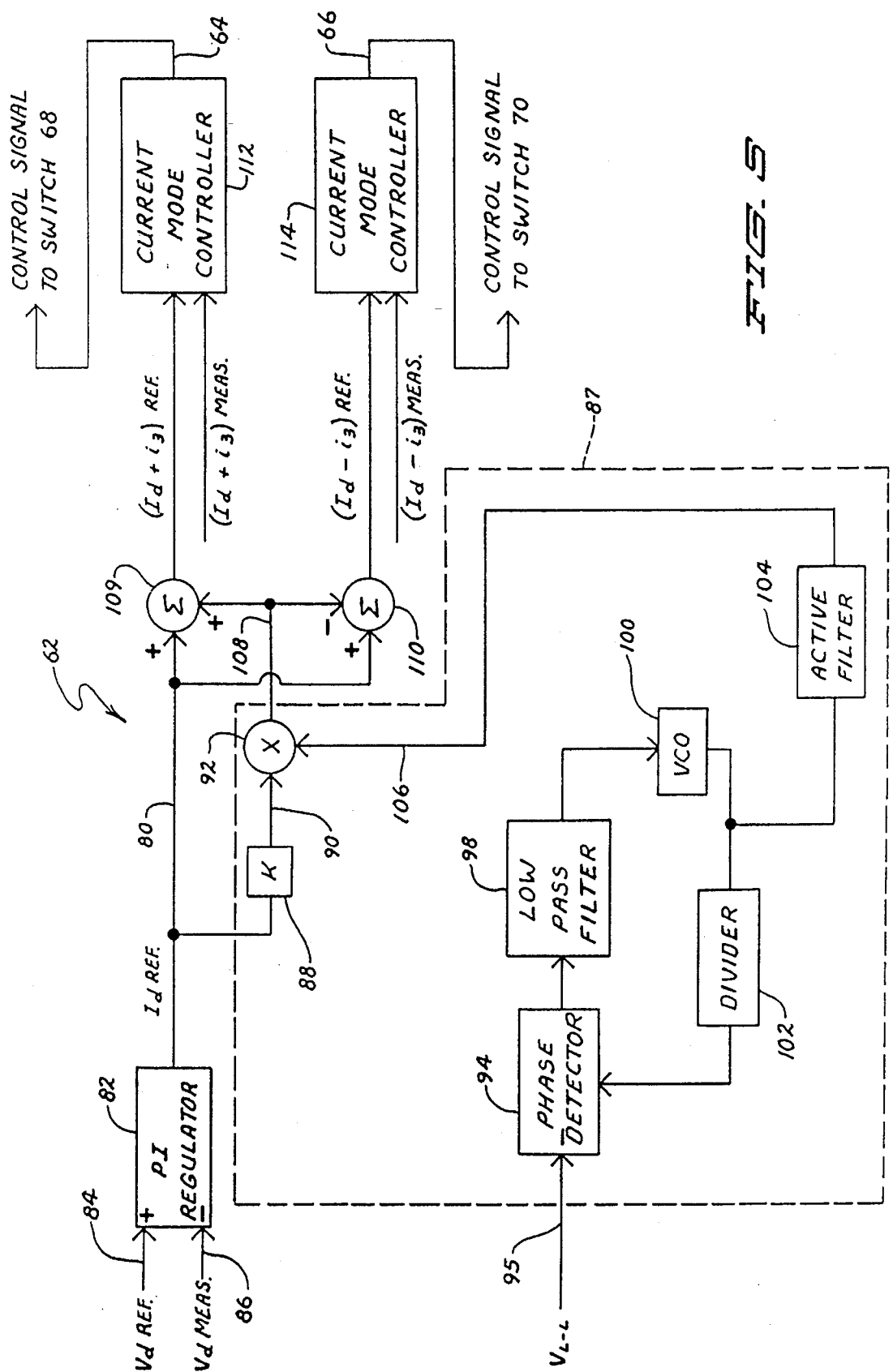
FIG. 5 is a schematic representation of a control arrangement for controlling switches for DC system current control and harmonic current reinjection into the utility system.

Referring to FIG. 5, a block schematic diagram of a typical controller 62 that is usable for controlling the switches 68 and 70 is illustrated. Controller 62 is made of known components, and is made to operate the switches in response to a comparison between what is desired as a reference current, based on reference voltage $V_d$, and what is actually the measured current on the respective lines 44A and 44B. In the controller, a reference current $I_{d,Ref}$ is generated on a line 80. This $I_{d,Ref}$ is obtained by comparing a reference voltage with a measured voltage using a proportional integral PI regulator 82. The reference voltage is selected to be higher than the peak line to line voltage. The reference voltage is provided on line 84 and is compared with the measured voltage $V_d$, which is between the terminals 50A and 50B. The amplitude of the third harmonic frequency injection current $i_3$ is proportional to the reference current, and thus, the reference current $I_{d,Ref}$ is passed through an amplifier 88 that provides a current along a line 90 to a multiplier 92.

Injection of a third harmonic current into the utility system, which harmonic current is obtained by modulating the rectified output currents, reduces the magnitude of harmonics in the line currents. The magnitude or amplitude of the injected current is proportional to the load current $I_d$ provided to DC system 54. A proportional multiplying factor, k, is chosen to minimize a particular harmonic or combination thereof. For example, by means of Fourier analysis, it can be shown that if the fifth harmonic current is reduced to zero where the system inductance is assumed to be negligible (inductors 38A, 38B and 38C equal to zero), the multiplying factor k is equal to 0.64 times the reference current. Likewise, if the fifth and seventh harmonic currents are to be minimized according to the following equation $$\sqrt{I_5^2 + I_7^2}$$

the multiplying factor k is equal to 0.682 times the reference current. Other multiplying factors may be calculated as desired to minimize other harmonic currents or combinations thereof. The value of multiplying factor k provided by amplifier 88 may be adjusted to account for finite system inductance, if desired, and to further minimize remaining harmonic currents.

It is necessary that the $i_3$ current that is to be injected into the system is precisely synchronized in phase with the line currents on lines 40A, 40B and 40C. Thus, a conventional phase-locked loop comprising a phase detector 94, a low pass filter 98, a voltage controlled oscillator 100 and a divider 102 is provided. The phase detector 94 is provided with an input line 95 that detects the zero cross of the respective phases on lines 40A, 40B and 40C as represented by line to line voltage, $V_{LL}$. Phase detector 94 basically multiplies this line voltage signal with a square wave signal of the same frequency, providing an output signal which is passed through a low pass filter 98 to a voltage control oscillator 100, which, in turn, generates a square-wave signal equal to three times the frequency of the fundamental. This third harmonic frequency signal is passed through a divider 102 to reduce it to the fundamental frequency. The voltage controlled oscillator 100 can be selected to produce any desired harmonic frequency. Of course, divider 102 would be correspondingly adjusted to reduce the harmonic frequency to the fundamental frequency for comparison by phase detector 94. The output of the voltage controlled oscillator 100 is then passed through an active filter 104 which will permit a sine wave third harmonic signal to pass. In the case shown, the active filter 104 will take out all frequencies other than the third harmonic, or, in other words, a 180 Hz signal will be passed out along the line 106 to the multiplier 92. In the preferred embodiment, the amplitude of this third harmonic signal on line 106 is provided so that the desired amplitude from amplifier 88 is maintained to correspond to the amplitude of the signal on line 90. This will provide an output signal of $i_3$ along the lines 108 equal to the desired amplitude of the modulated reference current at the desired harmonic frequency. In the case of a thyristor converter, the line to line voltage, $V_{LL}$ is delayed by an angle α. Integrated circuits used for thyristor control can also provide the signal which represents $V_{LL}$, but delayed by angle α.

Since the switches 68 and 70 are providing currents that are present on line 48 comprising the reference DC current plus the harmonic injection current, minus the reference current minus the harmonic injection current, respectively, the $i_3$ current on line 108 is precisely synchronized and in phase with the fundamental frequency. This current $i_3$ is added to the reference current $I_d$ at summing junction 109, and it is subtracted from the reference current $I_d$ in summing junction 110.

The control signal for controlling switch 68 is generated from a current mode controller 112 which has its inputs connected to the output of the summing junction 109 ($I_d + i_3$) and to a measured current on line 44A which may be sensed with a current sensor 113 shown in FIG. 2. A second current mode controller 114 has as one input the reference signal $I_d - i_3$, which is the output of summing junction 110, and as a second input, a measured current on line 44B using a current sensor schematically shown at 115 in FIG. 2.

The function of the current mode controllers 112 and 114 controlling the switches 68 and 70 is to provide $i_x$ and $i_y$, respectively, equal to the respective reference current input. Various forms of current mode controllers are well known. The simplest is a tolerance band controller as shown and described on page 147 of Power Electronics by Ned Mohan et. al., John Wiley & Sons (1989). Also, such controllers are described at page 323 of IEEE Transactions on Industrial Electronics, Volume 37, Number 4, (August 1990). Commercially available integrated circuits also have the ability to control switches 68 and 70 to modulate the DC current and provide the third harmonic current. The current mode controllers thus modulate the current signals to provide a $2i_3$ current on line 48.

Figure 4:
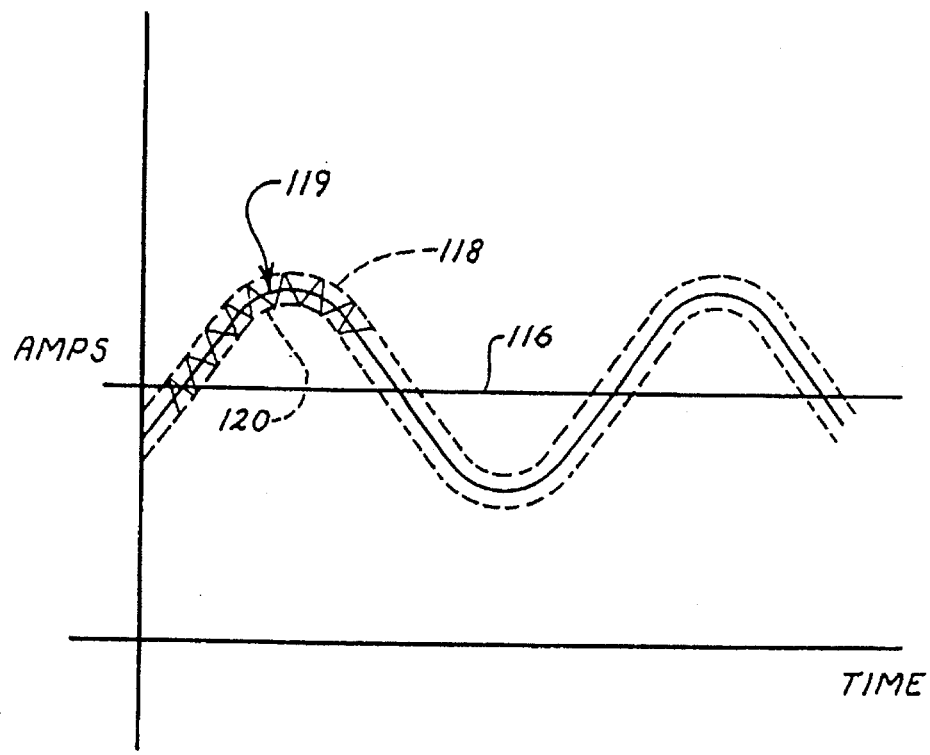
FIG. 4 is an enlarged schematic representation of a plot of the simultaneous dc-system regulation and harmonic current generation arrangement achieved with the present invention.

This injection current will be precisely synchronized in phase with currents on lines 40A, 40B and 40C, and will provide the harmonic component to be added to the AC system. FIG. 4 illustrates the DC current $I_d$ represented by a line 116 and superimposed thereon is the third harmonic current represented by line 119 with the tolerance band indicated by dotted lines 118 and 120. The controllers provide the desired total current level of $I_d + i_3$ or, $I_d - i_3$, depending on the switch being controlled.

The representation in FIG. 4 is for explanation purposes only.

Figure 6:
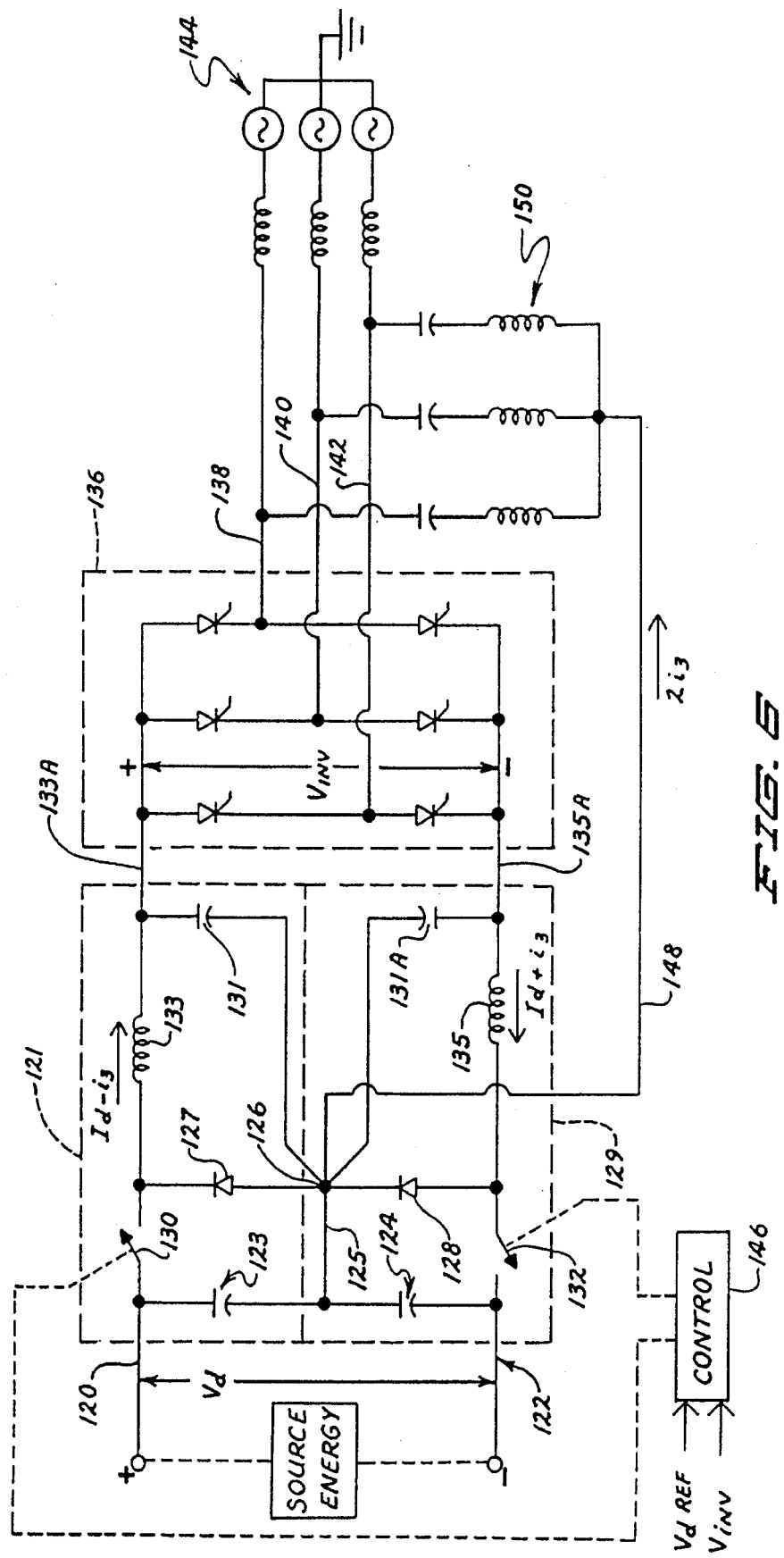
FIG. 6 is a schematic representation of the system of the present invention used for a DC to AC inverter to provide for transforming energy from renewable energy sources to use in a utility system.

As shown in FIG. 6, the injection current of the present invention can be used for providing a desired harmonic current to allow a nearly sinusoidal current interface between a three-phase utility and a renewable energy source, such as a wind generator, or solar cells, fuel cells or a small hydroplant.

In FIG. 6, a renewable energy source providing a voltage $V_d$ is connected into lines 120 and 122, which are coupled across two step-down or "Buck" converters indicated generally at 121 and 129. Converters 121 and 129 include capacitors 123 and 124 connected to a center tap 125, which connects to a junction 126 between diodes 127 and 128 of converters 121 and 129, respectively. Ripple current control capacitors 131 and 131A are connected between junction 126 and lines 133A and 135A which lead from inductors 133 and 135 to a power inverter 136.

As shown, first and second switches 130 and 132, respectively, are in lines 120 and 122, respectively, between the junctions with the respective capacitors 123 and 124 and the diodes 127 and 128. The switches can be placed in other arrangements to form the step-down converters.

The capacitors 123 and 124 form storage capacitors for storing energy, and hence voltages on lines 120 and 122. Current from the renewable energy source is conducted through the inductors 133 and 135, to power inverter 136. The inverter 136 comprises a thyristor inverter of known design which is provided with signals to control gates that permit the DC system current to be pulsed into separate phase lines 138, 140 and 142 that lead to an AC generating system indicated schematically and generally at 144.

The inverter 136 can be made up of GTOs. GTOs require current commutation capacitors to be added for satisfactory operation as is known and described in FIG. 7 of a paper entitled "Description and Perspective Application of New Multi-Terminal HVDC System Concepts", by L. Knudsen, B. Hansson and A. Ekstrom, published by Cigre, 112 boulevard Haussman, 75008 Paris, as Number 14–201 and presented 26 Aug. —1 September 1990.

Figure 9:
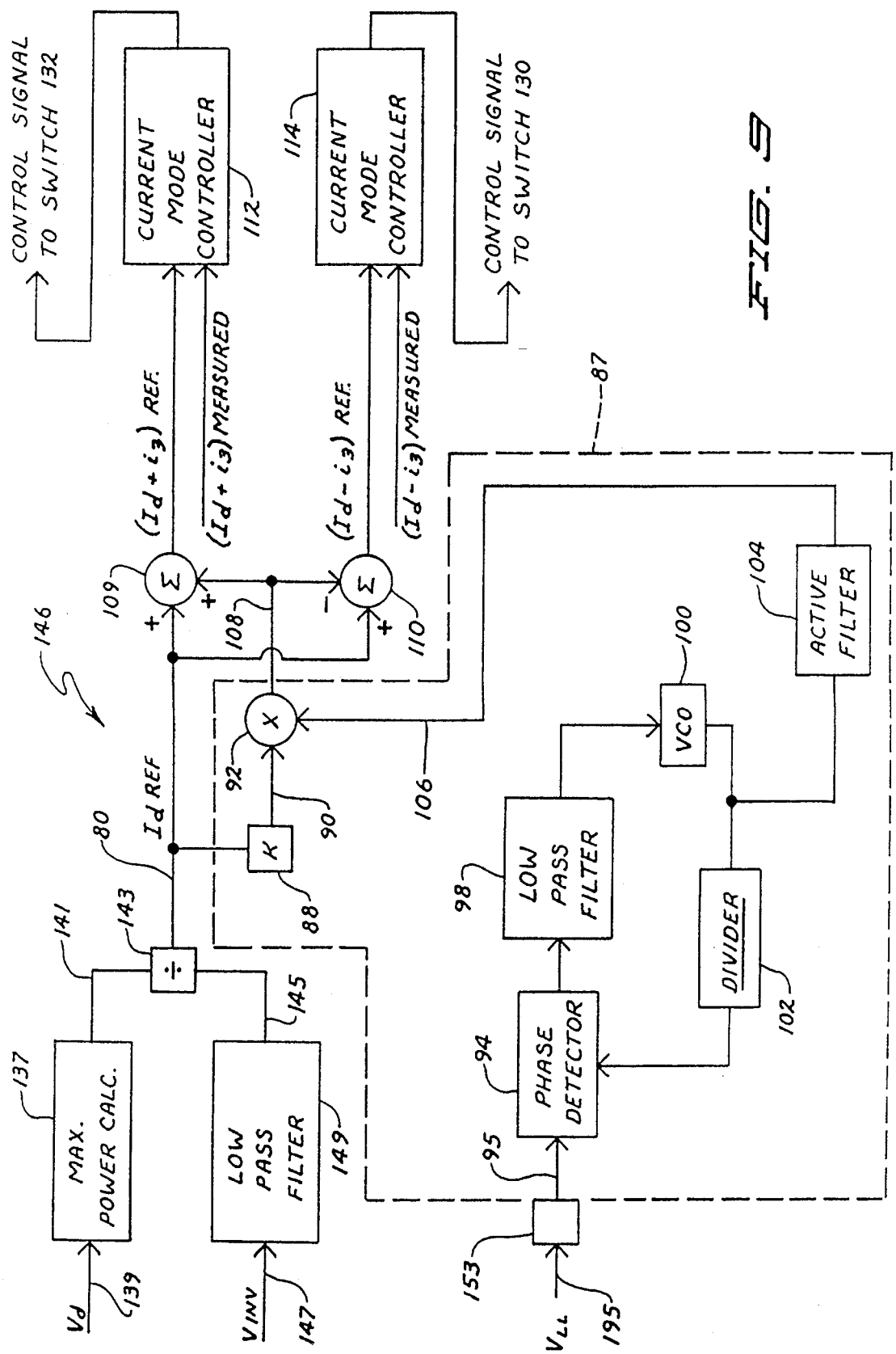
FIG. 9 is a schematic representation of a control arrangement for controlling the switches in a system where an inverter is used.

A switch control circuit indicated at 146 in FIG. 6 is used for controlling the switches 130 and 132 at the selected frequency. FIG. 9 illustrates schematically the control circuit 146 for the inverter arrangement. As shown, control circuit 146 is substantially similar to the control circuit of FIGS. 2 and 5 with differences residing in the generation of the reference current on line 80. Referring to FIG. 9, the reference current is generated based on the DC voltage $V_d$ across lines 120 and 122 and the time varying voltage $V_{INV}$ provided across inverter 136. The DC voltage $V_d$ is provided to a maximum power calculator 137 of conventional design on a line 139. Maximum power calculator 137 provides an output signal on line 141 that is proportional to the maximum power that can be obtained from the renewable energy source connected across lines 120 and 122, such as a solar cell power system. Line 141 is connected to a divider circuit 143 that receives the average voltage across the inverter 136 as a second input on a line 145. The average voltage on line 145 is obtained by supplying the time varying voltage $v_{INV}$ on line 147 to a low pass filter 149. The divider 143 then divides the maximum power signal on line 141 by the average voltage signal from low pass filter 149 on line 145 to obtain the reference current on line 80. The reference current is combined with a selected harmonic injection current signal in the same manner as described with control circuit 62 to provide control signals to switches 130 and 132. The other components shown in FIG. 9 are numbered as in FIG. 5.

However, $V_{LL}$ on line 195 is passed through a delay circuit illustrated at 153 to delay the firing angle α of the thyristors. The delay circuit 153 can be a TCA 780 circuit made by Siemens. The circuit 153 delays $V_{LL}$ by angle e before providing $V_{LL}$ to phase detector 94.

Since one can control switches 130 and 132 for regulating the current, the firing angle of the thyristors in inverter 136 can be kept constant. Actual and active control of $I_d$ in FIG. 6 means one does not have to change the thyristor firing angle in order to regulate power. The objective is to provide the correct power to the AC system. The present arrangement permits changing the current $I_d$, rather than changing $V_{INV}$ by changing the thyristor firing angle.

If the energy source connected across lines 120 and 122 provides a controllable amount of power, for example, as with a battery storage system, the maximum power calculator 137 may be eliminated, and a suitable signal that represents the controlled desirable power output from the battery storage system provided directly to divider 143.

As shown, the control circuit 146 includes current mode controllers 112 and 114 (FIG. 9) for providing a signal to each of the separate switches 130 and 132. Current mode controllers 112 and 114 compare the generated reference current, $I_d-i_3$ and $I_d+i_3$, with the measured current in the respective inductors 133 and 135 connected to the inverter 136. The currents are added at junction 126 so that $2i_3$ is on a line 148 which is used for injecting current into the individual AC lines 138, 140 and 142 for reducing a desired harmonic. The harmonic current is synchronized and in phase and delayed by angle α through delay circuit 153. The impedance network for each of the AC lines 138, 140 and 142 is indicated at 150, in general, and each branch includes an inductor and capacitor in series connected to the separate line. The pure capacitance impedance or the high pass filter arrangement previously described can also be used for the injection of current into the lines of the AC system. The $2i_3$ current on line 148 is thus divided so that two-thirds of $i_3$ is provided to each AC phase. The injection of the harmonic current through impedance network 150 provides the harmonic current needed to substantially reduce the total harmonic distortion at the alternating current generating system.

Figure 7:
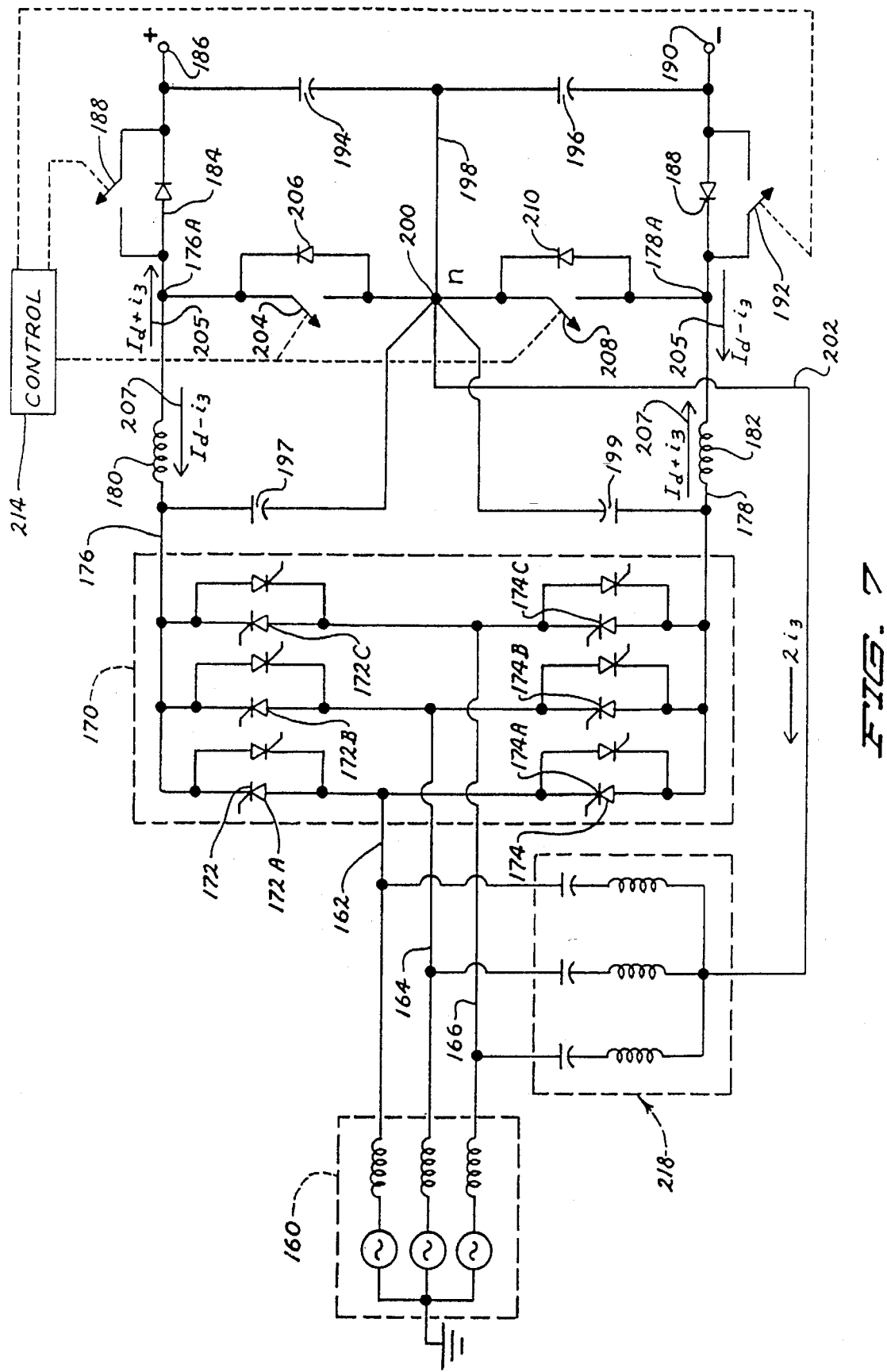
FIG. 7 is a schematic representation of the present invention used in a bidirectional, that is, DC to AC or AC to DC system.

In FIG. 7, the present invention is shown for applications such as battery storage where bidirectional power flow is required. In FIG. 7, there is a utility system grid modeled as a three-phase source indicated at 160, which has inductors in lines 162, 164 and 166. A bidirectional converter indicated at 170 is connected to each of the lines, and is made up of thyristors shown generally at 172 and 174. When thyristors 172A, 172B and 172C and 174A, 174B and 174C are gaited properly they provide for conversion of the AC input to a rectified signal on output lines 176 and 178. Each of the lines in the converter has thyristors in parallel with the rectifying thyristors and active in opposite directions, so when the parallel thyristors are operated to conduct in opposite direction, a DC current on the lines 176 and 178 will be pulsed, upon proper gating of the parallel thyristors, to provide for pulsed currents into each of the three-phase lines 162,164 and 166. The converter 170 is a well known arrangement using line commutated thyristors, or gate-turnoff thyristors (GTO's) with capacitor commutating, or similar components. In FIG. 7, the thyristors indicated at 172A, 172B and 172C, and as at 174A, 174B and 174C, can have a continuous gate pulse when they are operating in the rectifying mode, that is converting the AC signals into DC signals. These components must not be diodes, but they can be GTO'S. These same thyristors 172A, 172B and 172C and 174A, 174B and 174C will have no gate pulses and will not conduct during the time when the parallel thyristors are operating in an inverter mode, and thus when stored or generated energy at a DC voltage is changed into an AC voltage that is provided back to the utility system.

The lines 176 and 178 have inductors 180 and 182 therein which are commonly used in step-up or step-down converters. Line 176 has a diode 184 permitting DC currents to go to an output terminal 186 and connected in parallel with the diode 184 is a switch 188. Similarly, line 178 has a diode 188 therein leading from a terminal 190 of the DC system, and a voltage $V_d$ is present across the terminals 186 and 190. A switch 192 is also connected in parallel with the diode 188.

A pair of capacitors 194 and 196 are connected across the terminals 186 and 190, and a center tap line 198 between the capacitors 194 and 196 leads to a junction 200, to which a current feedback line 202 is connected. Junction 200 is connected across a switch 204 and an antiparallel diode 206 to a node 176A and is also connected through a switch 208 and an antiparallel connected diode 210 to a node 178A. Ripple current control capacitors 197 and 198 are connected from junction 200 to the respective lines 176 and 178.

The switch control circuit indicated at 214 is made so that it controls the switches 204 and 208 to provide current pulses at the desired frequency when the unit is operating as an AC generating-DC load system, in the same manner as shown in FIG. 2. A switching frequency would be provided as previously explained and the current $i_3$ in FIG. 2 is added in line 176 to the DC current Ia, and is subtracted in line 178 from the current $I_d$, with the current direction as indicated by arrows 205. At junction 200, the current will be $2i_3$, which is carried on line 202 to the three branch impedance network 218. As shown, the branches are series connected inductors and capacitors, with each being connected to a separate one of the three-phase lines 162, 164 and 166.

It also should be noted that when converter 170 is operating as a rectifier and thyristors 172A-C and 174A-C are operating, switches 204 and 208 are operated and switches 188 and 192 remain open. In the inverter mode, switches 188 and 192 operate and switches 204 and 208 are open.

The energy could be stored on the DC system in a battery during AC to DC operation. When the battery is to be used for supplying power to the utility, the switches 204 and 208 would be disabled, and the control 214 would then, in response to signals, provide $2i_3$ on line 202 by operating the switches 188 and 192. Current $i_3$ is subtracted in line 176 to the DC current $I_d$ and is added to $I_d$ in line 178. Current direction in this mode is indicated by arrows 207. The operation is equivalent to that described in conjunction with FIG. 6. FIG. 7 is essentially a combination of operations of FIGS. 2 and 6.

The circuit topologies discussed in the previous figures are all of a six-pulse nature, where if the harmonic problem was not corrected, current harmonics on the order of 6n± 1 (that is, 5, 7, 11, 13, 17, 19 etc.) would be generated. The devices of the present invention for injecting currents back into the generating system can be extended into twelve-pulse topologies in higher power applications. A 30° phase shift is achieved by delta-wye and delta-delta transformer connections, and the current harmonics are reduced to the order of $12n \pm 1$ (that is, 11, 13, 23, 25, etc.). Hence the dominant 5th and 7th current harmonics of the 6-pulse converter are inherently eliminated.

Figure 8:
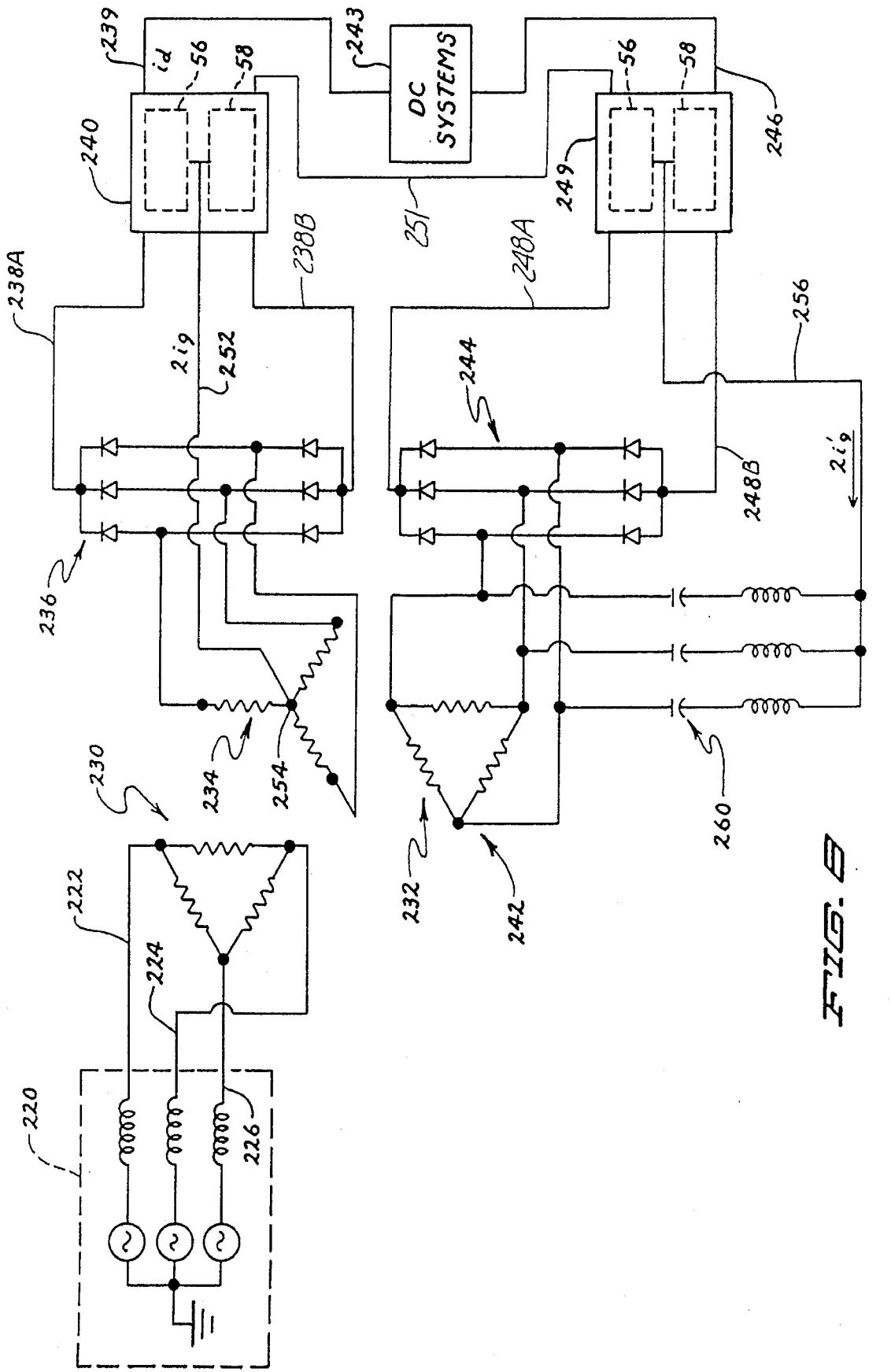
FIG. 8 is a schematic representation showing the present invention applied to a 12-pulse topology utility system.

A twelve-pulse system is shown in FIG. 8. An AC generating system 220 provides three-phase power at lines 222, 224, and 226 is connected to a delta to wye transformer indicated generally at 230, and which also includes a delta-delta transformer section 232, to provide a 30° phase shift, to one output side. The output or secondary wye connection side of the transformer indicated at 234 is passed through a converter of conventional design indicated at 236 to provide a DC output along the lines 238A and 238B which are provided through a boost converter assembly 240 and is carried through to a DC system 243 on the line 239. The delta connected secondary of the transformer 232 section is indicated at 242, and is connected to a diode converter 244 which is connected to a DC lines 248A and 248B from a second boost converter assembly 249 that is connected to the DC system through line 246. A line 251 completes series connection of the boost converter assemblies 240 and 249.

In the twelve-pulse topology of FIG. 8, the injected current is equal to the ninth harmonic, $i_9$, of the fundamental system frequency. The magnitude or amplitude of the injected current is again proportional to the load current provided to the DC system 243. Again, by means of Fourier analysis, it can be shown that if the eleventh harmonic current is reduced to zero, via the ideal case where system inductance of source 220 is assumed equal to zero, the magnitude of the ninth harmonic injected current is equal to 0.33 times the load current ($.33I_d$) supplied to DC system 243. As with the 6-pulse topologies described above, other harmonic current combinations may be minimized to provide other injected current magnitude values. If desired, to account for finite, system inductance, the magnitude of the ninth harmonic injected current $i_9$ may be adjusted to further minimize remaining harmonic currents, thus further reducing the total harmonic distortion.

The boost converter assemblies 240 and 249 each comprise two of the boost converters such as those shown in FIG. 2 at 56 and 58. These numerals are used for indicating that each part of the assembly has a switching connection such as those shown at 68 and 70. An output line 252 from the boost converter assembly 240 carries a current that is equal to $2i_9$, current where the injected current is to be equal to the ninth harmonic current. Line 252 is connected to the center tap or neutral 254 of the wye secondary 234 of the transformer. The boost assembly 249 includes step-up or boost converters 58 and 56, as shown, which provides another $2i_9'$ current along the line 256 to an impedance network 260 that injects a third of the $2i_9'$ current into each of the individual lines coming from the delta connected secondary 242, to inject current that is equal to $2 \times 0.33 I_d$, the current flowing in lines 238. The switch controllers providing the modulated DC current to provide the $2i_9'$ current are controlled to account for and correlate to the 30° phase shift provided in the transformer.

It should be noted that a tap is made for each of the converters from at least one of the individual output lines from the output sides of the transformer secondaries 234 and 242 to provide a phase signal so that the current generated is precisely synchronized in phase.

FIG. 8 illustrates the applicability of the invention to twelve-pulse topologies, and permits injection of the current directly into the AC side of the system. Twelve pulse topologies may also be used for DC to AC power flow and for bidirectional power flow.

The previous discussions have been centered around the use of the injection of a harmonic current in conjunction with a voltage source DC system. That is, on the DC side of the converter, which interfaces with the three-phase utility, a DC voltage is sensed and used for control.

Figure 10:
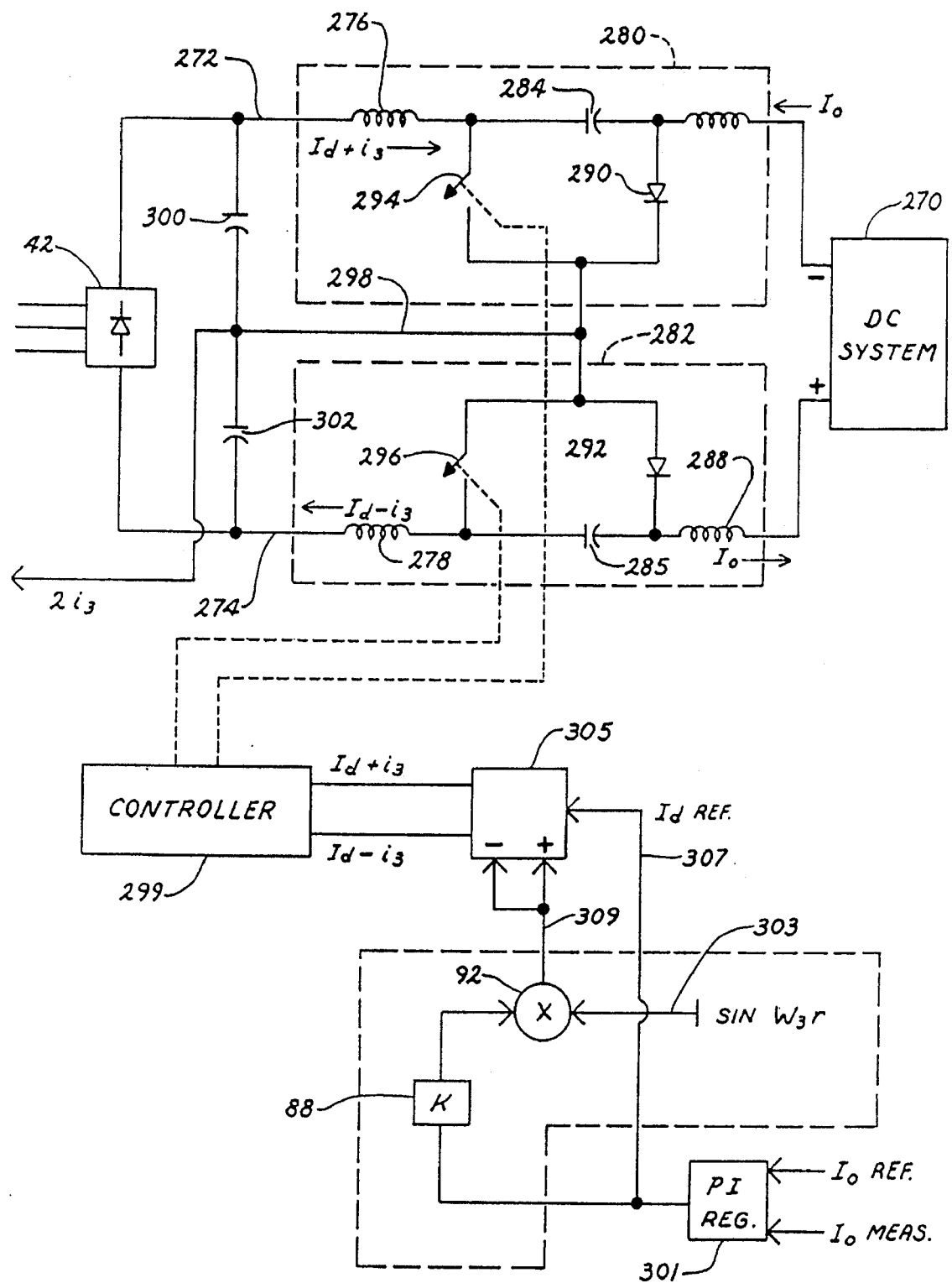
FIG. 10 is a schematic representation of a control arrangement of the invention used with a current source DC system.

In some systems, such as a current source inverter, the input AC current is highly distorted, and the displacement power factor also becomes very poor. Attempts to correct the poor displacement power factor have been made by using a diode rectifier for obtaining the DC voltage, and then using a DC-DC step-down converter. Such circuits are well known, since they have the same interface as the voltage source DC system shown in FIG. 2, for example, (the diode rectifier 42 in FIG. 2) the present current modulation arrangement disclosed previously can be applied to that type of circuit without any problem. It is also possible using the proposed approach to control the output DC current directly, and, as shown in FIG. 10, the type of converter, which is known in the art and is disclosed, for example, in U.S. Pat. No. 4,184,197, can be used with the present invention to produce third harmonic modulating currents. Referring to FIG. 10, the converter is indicated at 42, inasmuch as it is of substantially the same design as the converter shown in FIG. 2, and is connected to a DC system 270.

The lines 272 and 274 coming from the DC system to the converter 42 include inductors 276 and 278, respectively, which are parts of the step-up converters 280 and 282, respectively. The step-up converters in this instance have capacitors at 284 and 285 in the lines 272 and 274. The capacitor 284 is used to transfer energy from an inductor 276 to an inductor 286, and on the opposite line, capacitor 285 transfers energy between inductor 278 and inductor 288.

The step-up converters 280 and 282 include diodes 290 and 292 and switches 294 and 296, respectively, that are connected from the respective lines 272 and 274 to a common center line 298. The switches 294 and 296 are controlled by a controller 299. The controller inputs are derived in a manner similar to that shown in FIG. 5, and a PI regulator 301 receives $I_{ORef}$ and $I_{O\ measured}$, and provides an output current $I_{dRef}$. This is used as shown for the reference current in FIG. 5, to develop a reference current for a multiplier 92, which also receives a phase signal along a line 303. The reference current is provided to multiplier 92 through a multiplier amplifier 88. A circuit indicated at 305 is essentially a pair of summing junctions that sum the reference current along the line 307 with an is current signal along the line 309 to provide two outputs, one $I_d + i_3$, and one $I_d - i_3$ to the controller 299.

The controller 299 is provided with the reference currents, and also receives the measured currents, and controls the switches 294 and 296 in the manner previously explained to maintain the desired current in the system. The current flowing in the inductors 276 and 278 will be $I_d + i_3$ and $I_d - i_3$, as shown. A current $2i_3$ will be injected through the line 298 utilizing the impedance network shown in FIG. 2 comprising three branches, each of which has a series connected inductor and capacitance tuned to a desired frequency.

Small capacitors 300 and 302 are connected across the line 298 and lines 272 and 274, respectively to allow flow of ripple current. This system will produce modulating currents for reducing the harmonic distortion, as previously explained. Drawbacks of a current source system, namely, input current distortion and poor displacement power factor are taken care of, and $I_0$ is controllable.

The circuit of FIG. 10 can be adapted for bidirectional power flow, if diodes 290 and 292 were replaced by controllable switches and the rectifier circuit 42 was replaced with a suitable voltage converter as shown at 170 in FIG. 7. Such arrangement is shown on page 345, FIG. 30 of "Advances in Switched Mode Power conversion", Teslaco Power Electronics Series, Volume 2, by Cuk and Middlebrook (1981).

Thus, the input reference and measured signals used to provide a switch control signal can be either a DC voltage or a DC current, for controlling the modulating converters which provide the harmonic current signal precisely in phase with the AC side, and which is injected back into the AC system through the impedance network.

The reinjection of the harmonic currents, whether it is the third or ninth harmonic as disclosed, using series inductance and capacitance branches provides for a low loss, inexpensive injection of the desired harmonic current for protecting the AC system from harmonic currents. The arrangement shown results in a slightly leading power factor at the line frequency, which is desirable in order to cancel a lagging power factor currents drawn by many loads. Additionally, a regulated DC output voltage or desired power flow is achieved with the present arrangement.

It is not necessary that the series inductance-capacitance branches of the impedance network be sharply tuned for the respective third or ninth harmonic frequency. The series inductance-capacitance branches should be tuned at a frequency different from, but close to, the desired frequency of the injected harmonic. As a consequence, sinking of the harmonic currents from the AC system is avoided, which is usually a drawback for passive filters, and a slight unbalance in the three branches of the impedance network does not lead to a large percentage unbalance in the individual inductance-capacitance branch impedances at the third harmonic frequency. It should also be mentioned that keeping the resonant frequencies of the impedance network branches close to the harmonic being injected is desirable, because otherwise the voltage drop across the individual inductor capacitance series connected legs can become too large. The voltage across this impedance network adds to the voltages that are present between the center tap 60 on the boost converter of FIG. 2, for example, on line 44A and between the center tap 60 and the line 44B and it may, therefore, increase the need for a greater voltage rating on the switches 68 and 70.

Figure 11:
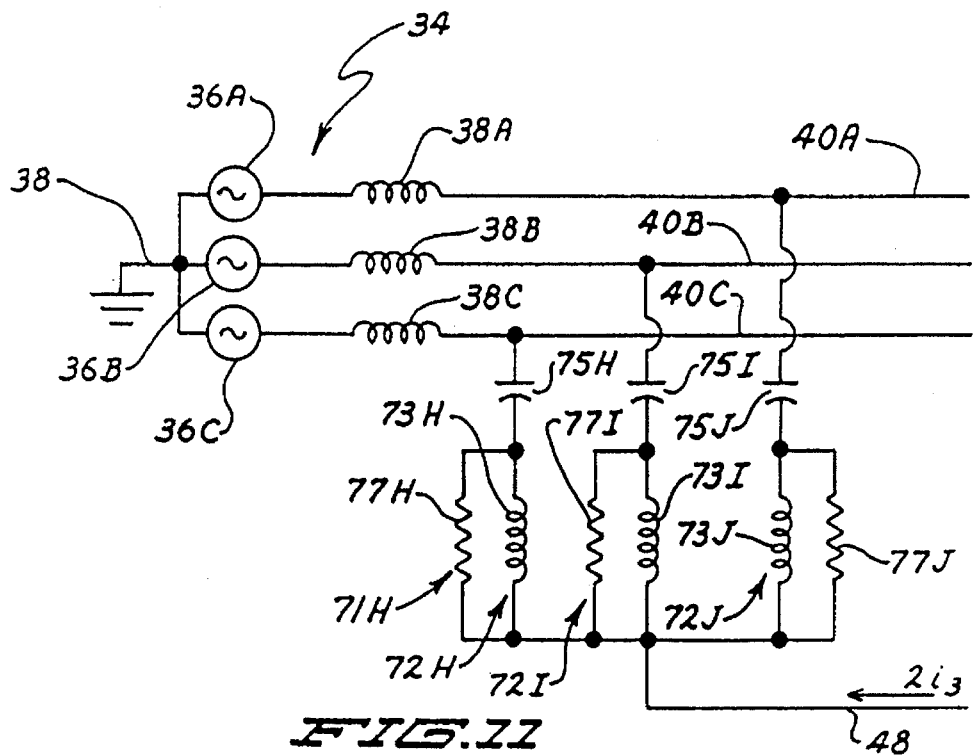
FIG. 11 is a representation of a variation of an impedance network comprising a high pass filter used for injecting a harmonic current into the utility system.

In FIG. 11 a first modification of the impedance network used for injecting the harmonic current from line 48 into the lines 40A, 40B and 40C. The impedance network 71H comprises a high pass filter for each branch 72H, 72I and 72J by connecting a resistor 77H, 77I and 77J, respectively in parallel with inductors 73H, 73I and 73J, respectively. Capacitors 75H, 75I and 75J are connected as shown.

Figure 12:
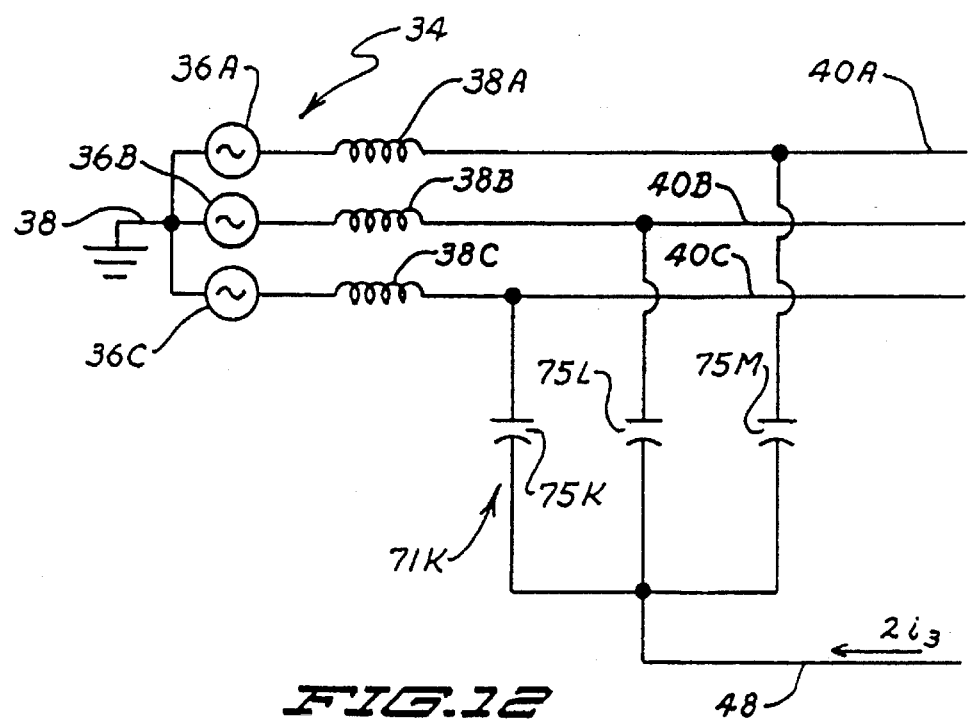
FIG. 12 illustrates the impedance network of FIG. 11 comprising pure capacitance impedance.

In FIG. 12 the impedance network is further modified to use pure capacitance. The network 71K comprises capacitors 75K, 75L and 75M connected to lines 48 and lines 40A, 40B and 40C.

The system of the present invention also permits applying some of the known or older injection techniques, such as the use of active filters, to be applied in addition to the present invention circuitry, where applications requiring a very low total harmonic distortion is essential.

It also should be noted that if desired, high frequency isolation transformers can be applied to the systems, to provide electrical isolation. This would be to provide electrical isolation between the DC lines or bus and the utility voltages.

The high frequency transformer can be located as part of the boost converters 56 and 58. Such a current source converter is shown on page 226 of the book "Power Electronics", by Ned Mohan et. al., John Wiley & Sons (1989). Additionally, this particular textbook at page 147 and following explains how the tolerance band control for current regulated modulation is carried out, and principles shown can be applied to the present generation of $i_3$ and $i_9$ currents.

Reference is also further made to page 221 of the same textbook for illustrations of high frequency isolation circuits that can be incorporated into buck-converters 121 and 129 of FIG. 6, such as that shown at 136 in FIG. 6.

Figure 13:
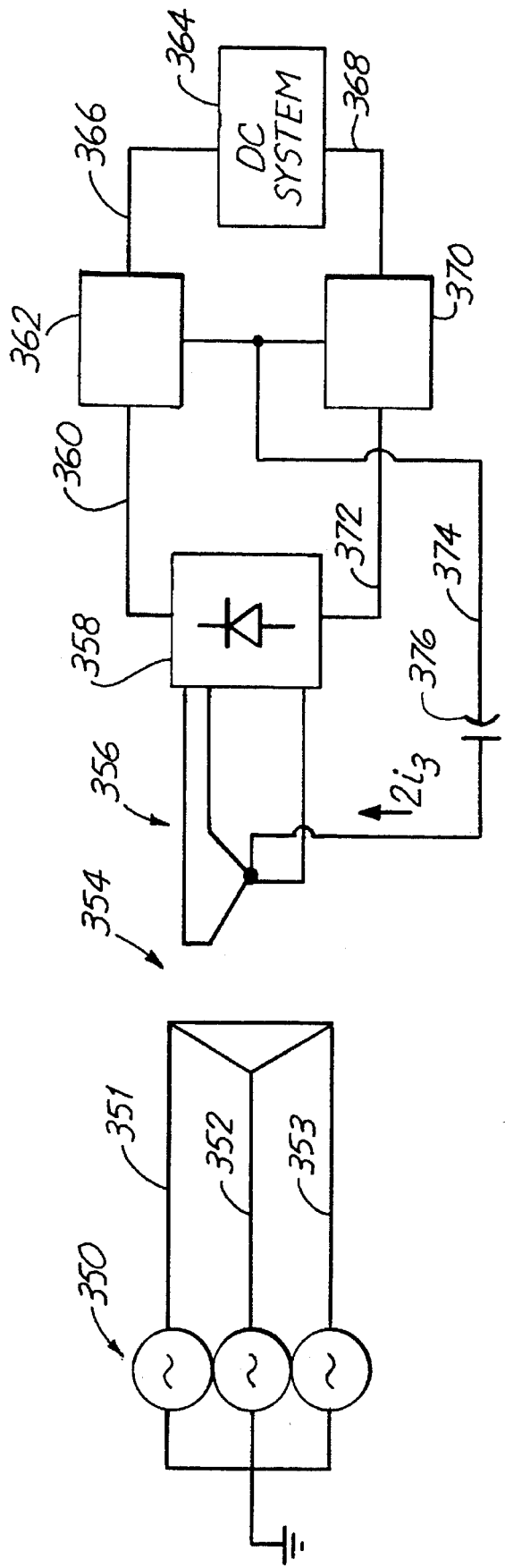
FIG. 13 is a schematic representation of another embodiment of the present invention as applied to reducing harmonic distortion between a utility system and a DC system.

FIG. 8 illustrates that the injected current $2i_9$ can be injected into the neutral 254 of the wye secondary windings 234 of the transformer for a twelve-pulse system. Similarly and referring to FIG. 13, injection of the harmonic current into the center tap or neutral of a wye winding of a transformer is equally applicable in a six-pulse system. In FIG. 13 an AC generating system 350 provides three phase power at lines 351, 352, and 353 and is connected to a delta-wye transformer indicated generally at 354. The output or secondary wye windings indicated at 356 are connected to a converter of conventional design indicated at 358 to provide a DC output current on the line 360. Line 360 is connected to a boost converter assembly 362, similar to boost converter assemblies previously described such as boost converter 56 of FIG. 2, and is connected to a DC system 364 on a line 366. The DC system 364 returns current along a line 368 to a boost converter assembly 370 of similar design to boost converter 362, which in turn is connected back to the converter 358, on line 372. the boost converter assemblies 362 and 370 are connected to a common output line 374 which carries an harmonic current that is equal to $2i_3$. Additional frequencies such as the ninth frequency, $i_9$, can be further modulated and injected along line 274 to further reduce harmonics. An optional capacitor 376 is series connected in the current injection line 374 to reduce the effect of impedance presented by the leakage inductance in the transformer 354. The optional capacitor 376 also avoids the possibility of saturation of the windings in the injection circuit.

It is possible for the two boost converters 362 and 370 to modulate the currents applied to output line 374 described above at integer multiples of the third harmonic frequencies ($i_N$, where N= 3, 6, 9, 12 . . . ). The odd integer multiples of the third harmonic frequency (3, 9, 15, . . . ) can be injected in to the AC side as illustrated to reduce harmonic content, the even multiples of the third harmonic frequency 6, 12, 18, . . . ) do not have to be injected due to the six-pulse topology of the converter 358. As stated above, injection of currents at other harmonic frequencies further reduces harmonic content present on the utility grid.

Figure 14:
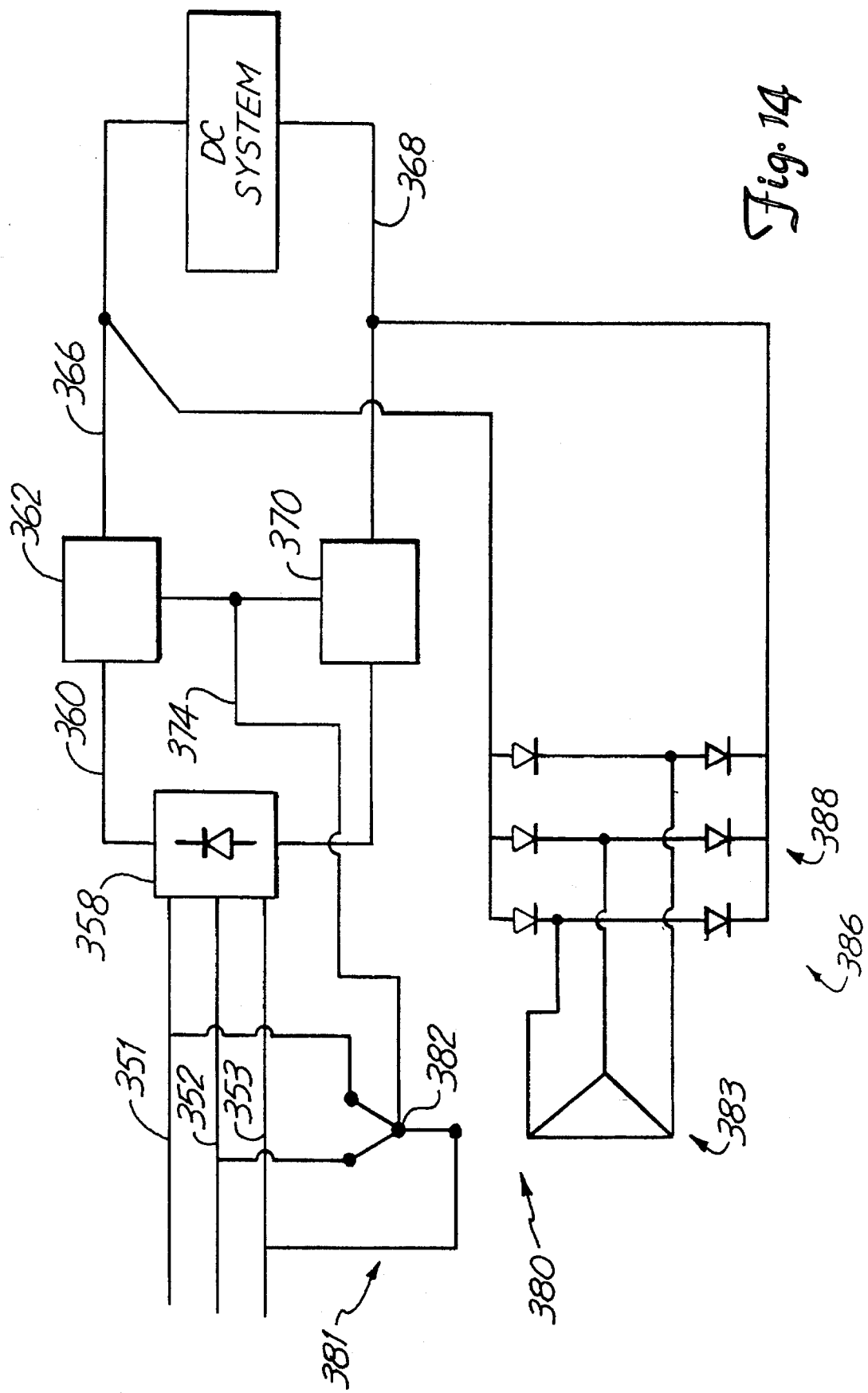
FIG. 14 is a schematic representation of another embodiment of the present invention as applied to reducing harmonic distortion between a utility system and a DC system.

FIG. 14 illustrates application of the present invention to another AC-DC conversion system wherein electrical isolation is not necessary between the conversion system and the electric utility. In FIG. 14, like reference numbers are used to indicate like elements or components as illustrated in FIG. 13. The conversion system 358 is connected to the electric utility grid with line conductors 351, 352 and 353. A wye-delta transformer 380, comprising three single-phase transformers or one three-phase transformer, is connected as illustrated between injection line 374 and lines 351, 352 and 353 for current injection. The wye connected winding 381 of transformer 380 divides the injected harmonic current to the lines 351, 352 and 353 equally from the center tap or neutral 382. The wye connected winding 381 in the presence of the delta connected winding provides a low impedance path for the injected harmonic current, while providing a high impedance path for the line current at the fundamental frequency. Although illustrated in a system without an isolation power transformer, an isolation power transducer can be inserted between the junctions of transformer 288 to the lines 351–353 and the utility system grid, not shown. As with the embodiment illustrated in FIG. 13, a capacitor, not shown, can be inserted in the injection current line 374. The power rating of transformer 380 will be approximately 30 percent of that of the transformer 354 in FIG. 13.

FIG. 14 further illustrates an optional energy recovery circuit 386 connected in parallel with the boost converters 362 and 370 across the DC system 364. The energy recovery circuit 386 includes a thyristor inverter 388 conventionally connected to the delta connected transformer windings 383. The thyristor inverter 388 converts power from the DC system 364 to AC which is then transferred to line conductors 351–353 through transformer 381. In another embodiment, the inverter 388 can be connected to the line conductors 351–353 as taught in "New Rectifier Circuits With Low Mains Pollution and Additional Low Cost Inverter For Energy Recovery" by Clemens Niermann, published in EPE, Aachen 1989, pp. 1131–36.

Figure 15:
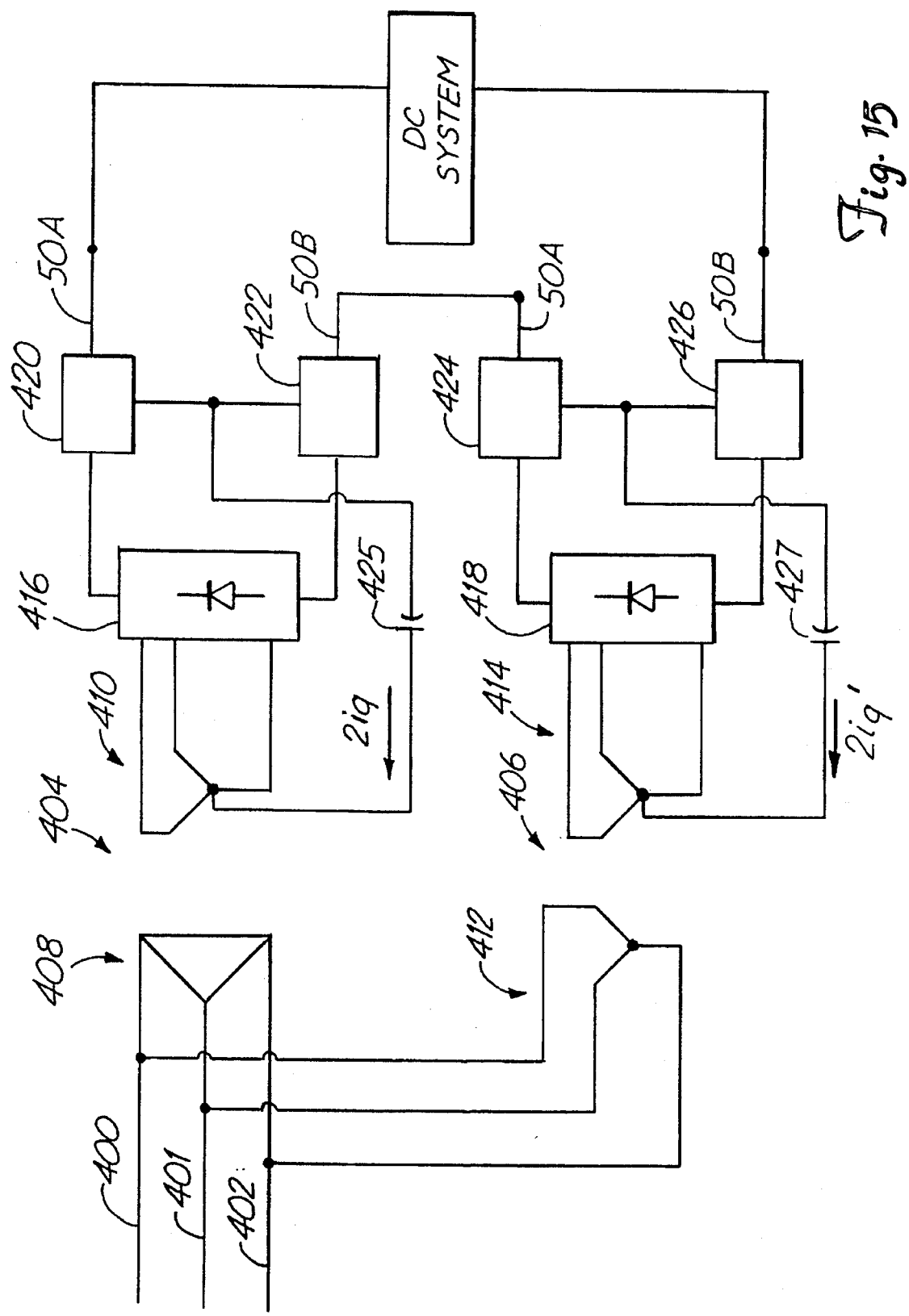
FIG. 15 is a schematic representation of another 12-pulse embodiment of the present invention as applied to reducing harmonic distortion between a utility system and a DC system.

FIG. 15 illustrates another twelve pulse system. Three-phase power provided on lines 400, 401 and 402 from a utility system, not shown, is connected to two transformers 404 and 406. Transformer 404 is a delta-wye transformer having a delta connected primary winding 408 and wye connected secondary winding 410. The delta-wye transformer 404 provides the necessary 30° phase shift needed for twelve-pulse operation. The transformer 404 can be constructed either from three single phase transformers properly connected, or alternatively, a single three-phase transformer. The transformer 406 having no substantial phase shift from the wye connected primary windings 412 to the wye connected secondary windings 414 must be formed from a single three-phase transformer. Each of the secondary transformer sections 410 and 414 are connected to converters of conventional design indicated at 416 and 418, respectively. Each converter 416 and 418 are connected to two boost converter assemblies 420 and 422, and 424 and 426, respectively. In one preferred embodiment, the boost converters 420 and 424 are similar to boost converter 56 and the boost convertors 422 and 426 are similar to the boost convertor 58, the output terminals 50A and 50B of FIG. 2 have been provided to illustrate a series connection of the boost convertors.

As discussed above with respect to FIG. 8, in the twelve-pulse topology, the injected current is equal to the ninth harmonic, $i_9$, of the fundamental system frequency. As with the sixth-pulse topology described above, other harmonic current combinations may be used to further to minimize harmonic content on the AC system. Optional capacitors 425 and 427 are series connected in the current injection lines to reduce the effect of impedance presented by the leakage inductance in the transformers 404 and 406, respectively.

Figure 16:
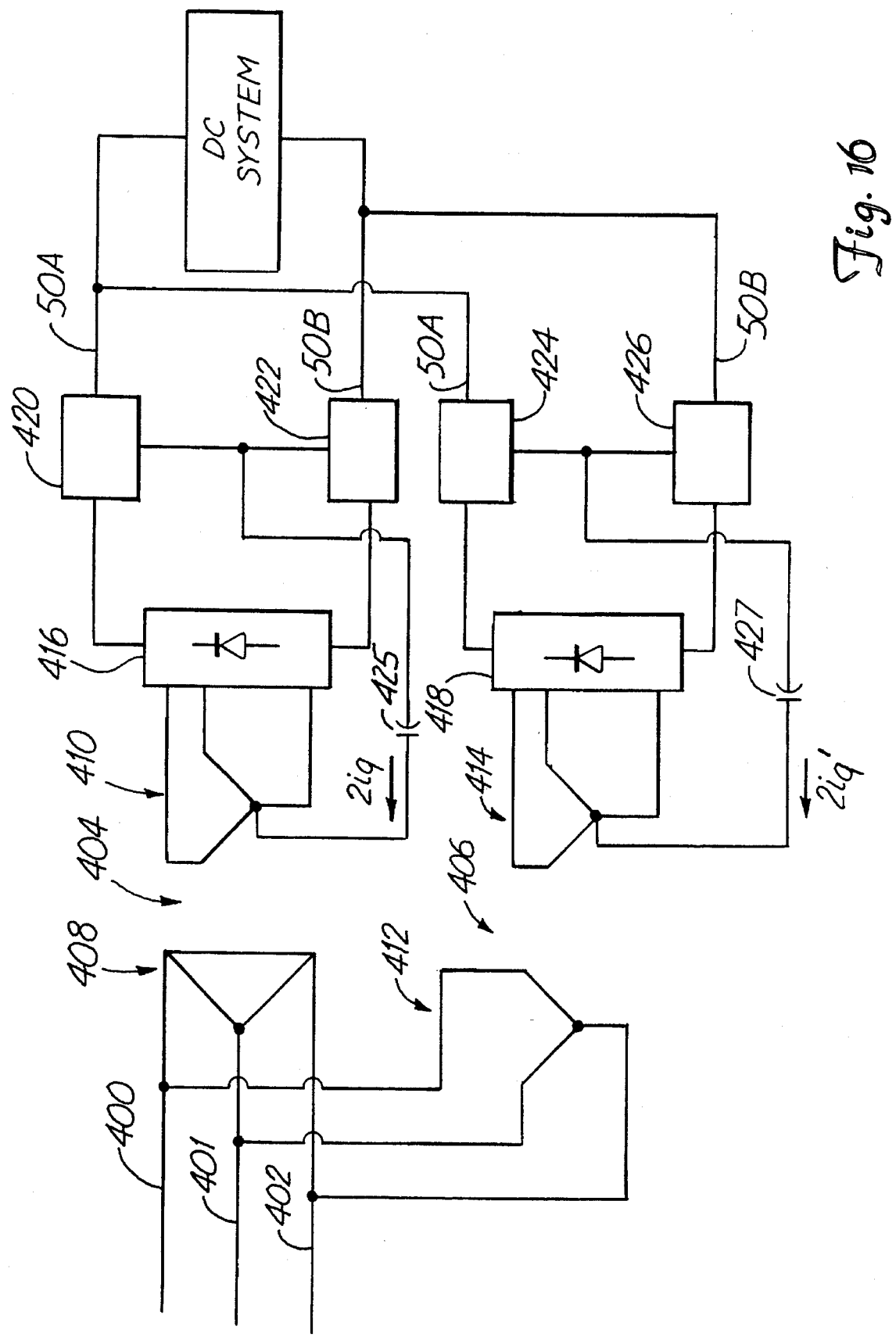
FIG. 16 is a schematic representation of another 12-pulse embodiment of the present invention as applied to reducing harmonic distortion between a utility system and a DC system.
Figure 17:
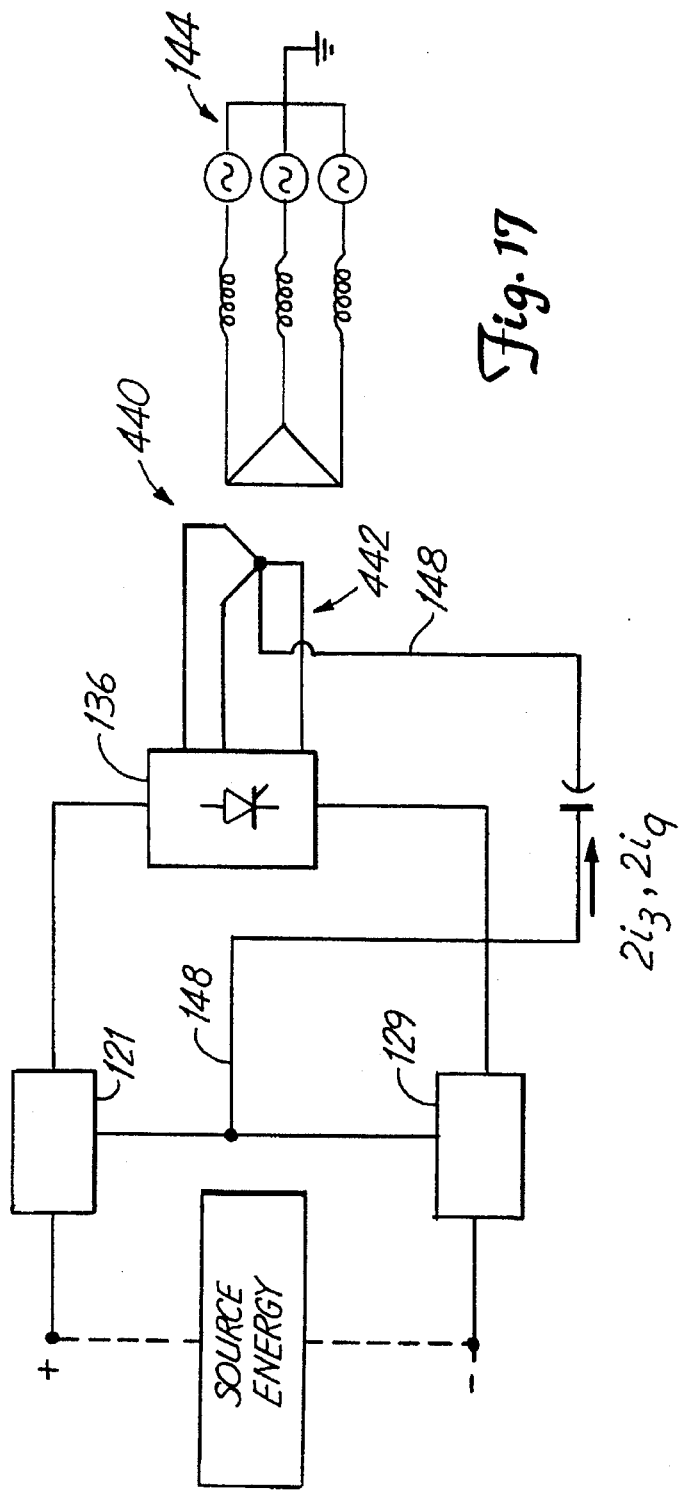
FIG. 17 is a schematic representation of another embodiment of the present invention as applied to reducing harmonic distortion between a utility system and a DC system.
Figure 18:
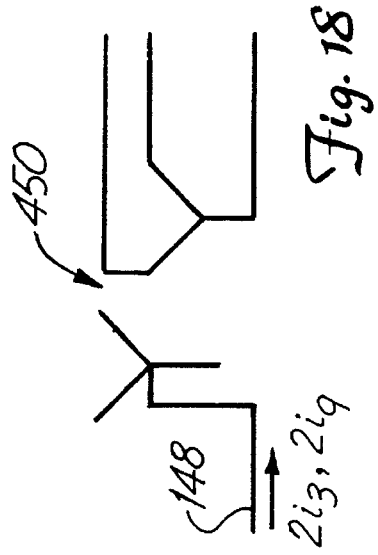
FIG. 18 is a schematic representation of another transformer for use in the system of FIG. 17.

FIG. 16 illustrates a twelve-pulse parallel connected system. Transformers 404 and 406, converters 416 and 418, and boost converters 420, 422, 424 and 426 described above with respect to FIG. 15, are connected as described above. As illustrated, the boost converters 420 and 422 are in parallel with the boost converters 424 and 426 to provide power to the DC system. FIG. 17 illustrates a modification to the embodiment illustrated in FIG. 6 wherein power is supplied to the electric utility system using the inverter 136 as a wye-delta transformer 440. As illustrated schematically therein, harmonic current is injected into the center tap or neutral of the wye-connected transformer winding 442. The transformer 440 can be formed from three single-phase transformers properly connected, or alternatively, from a single three0-phase transformer. If desired, the transformer 440 can be replaced with a wye-wye connected transformer 450 illustrated in FIG. 18. However, the transformer 450 must be formed from a single three phase transformer.

Figure 19A:
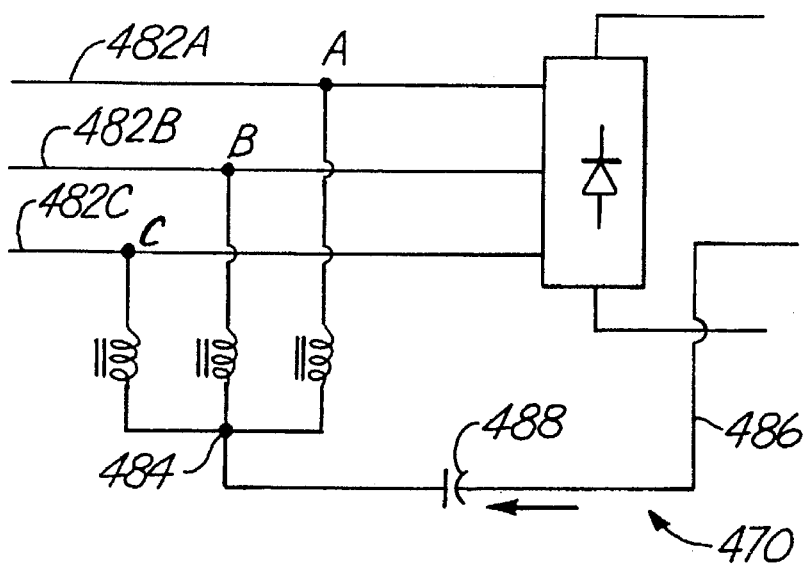
FIG. 19A is a schematic representation of a magnetic current injection device.
Figure 19B:
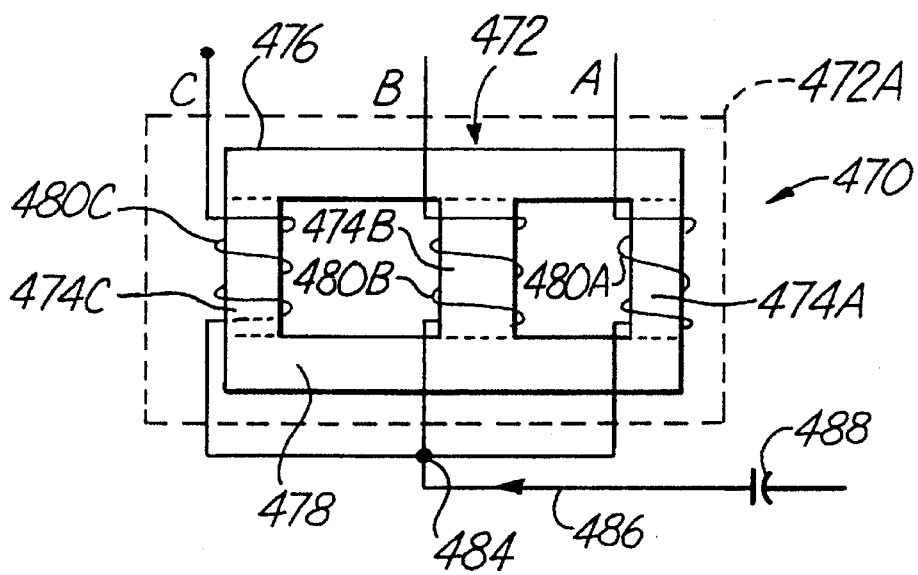
FIG. 19B is a plan view of the magnetic current injection device of FIG. 19A including a shield shown schematically.

FIGS. 19A and 19B illustrate a magnetic device 470 suitable for use with harmonic current injection in the above-described embodiments that do not inject current in to the neutral or center tap of an isolation transformer. The magnetic device 470 provides a low impedance path for the harmonic injection currents, while providing a high impedance path for currents at the fundamental frequency. The magnetic device 470 includes an integral three phase magnetic core structure indicated generally at 472 in FIG. 19B. The magnetic core structure 472 is made from a magnetically permeable material for forming at least one closed magnetic path therein. As illustrated the magnetic core structure includes three phase cores indicated at 474A, 474B and 474C. The phase cores 474A, 474B and 474C are joined together at opposite ends with core elements 476 and 478.

Phase windings 480A, 480B and 480C are wound around each phase core 474A, 474B and 474C, respectively. As illustrated, windings 480A, 480B and 480C are wound in the same direction around each corresponding phase core to provide magnetic flux in a uniform direction through the phase cores. Referring to FIG. 19A, an end of each winding is connected to one of the AC lines 482A, 482B and 482C connected to the electric utility system, not shown. At an end opposite the lines 482A, 482B and 482C, the phase windings are joined together at a common junction 484, which is connected to an injection current line 486 from the current injection circuit. With the single input connection terminal 484 and output terminals to lines 482A, 482B and 482C the magnetic current injection device 470 is a transformerless device wherein transformer coupling from a primary to secondary winding is not present. As with the embodiments described above, a capacitor 488 can be provided in the current injection line 486 to reduce the effect of impedance presented by the leakage inductance of the current injecting magnetic device.

Preferably, the thickness of the core structure 472 is minimized to reduce eddy current losses. In addition, the number of turns for each phase winding is minimized in order to reduce internal resistance. A shield of an electrically or magnetically conductive material 472A is provided to shield zero sequence flux from leaking outside the magnetic core structure 472.

FIGS. 20–24 illustrate other embodiments of the present invention. In FIGS. 20–24 like reference numbers are used to indicate like elements or components as illustrated in FIG. 14.

Figure 20:
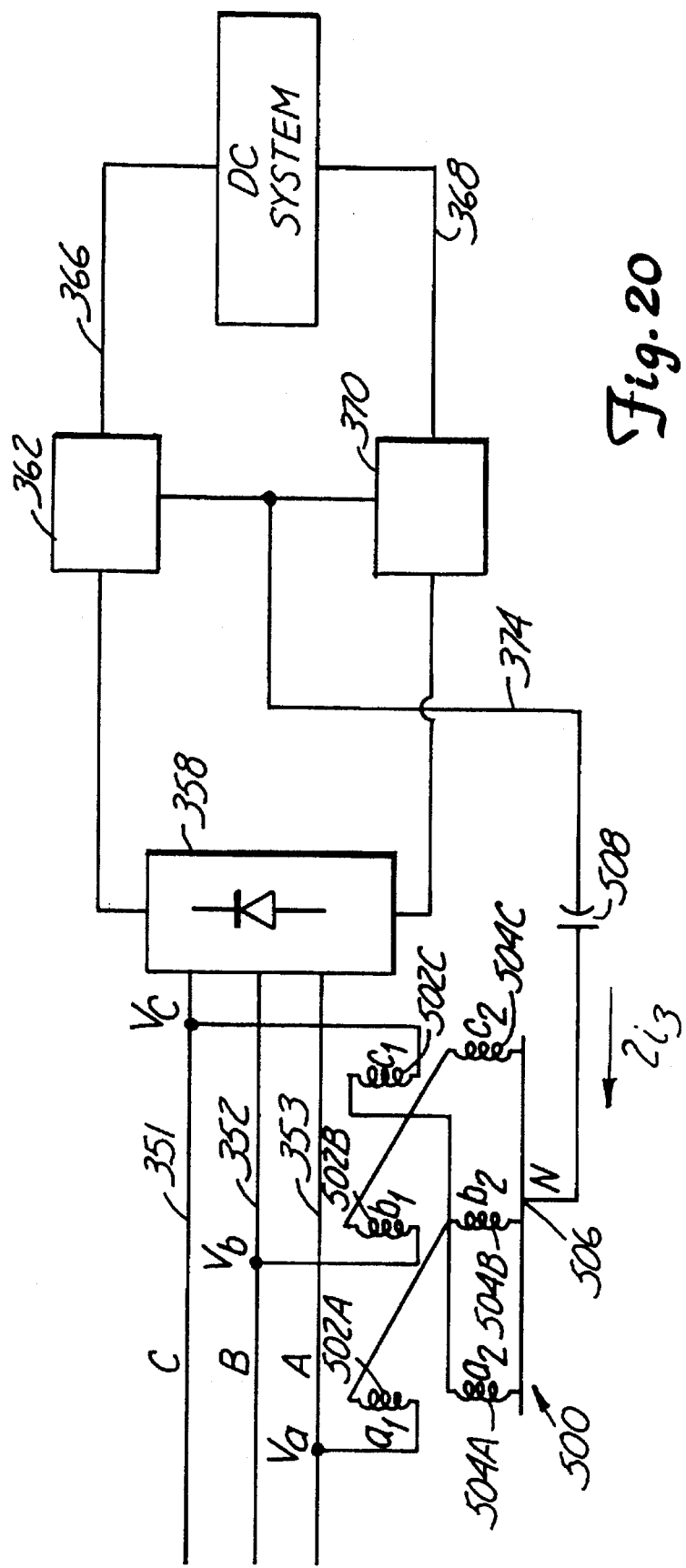
FIG. 20 is a schematic representation of another embodiment of the present invention as applied to reducing harmonic distortion between a utility system and a DC system.

FIG. 20 illustrates application of the present invention to another AC-DC conversion system wherein electrical isolation is not necessary between the conversion system and the electric utility. The conversion system 358 is connected to the electric utility grid with line conductors 351, 352 and 353. A zigzag connected set of windings (often called a zigzag autotransformer) windings 500 comprising a first set of windings 502A, 502B and 502C, and a second set of windings comprising 504A, 504B and 504C, are connected as illustrated between injection line 374 and lines 351, 352 and 353. The harmonic injection current carried by injection line 374 is injected into a neutral 506 of the zigzag windings 500. The zigzag windings 500 divide the injected harmonic current between the lines 351, 352 and 353 equally from the neutral 506. The zigzag windings 500 provide a low impedance path for the injected harmonic current, while providing a high impedance path for the line current at the fundamental frequency. The zigzag windings 500 are economically more feasible than the wye-delta transformer as illustrated in FIG. 14. The zigzag windings 500 will have a lower KVA rating than the wye to delta transformer 380. Copper losses will also be approximately 50% less than the wye-delta transformer 380.

As stated above, a capacitor 508 is optional. The capacitor 508 is series connected in the current injection of line 374 to reduce the effect of impedance presented by the leakage inductance in the windings 500.

Although illustrated in FIG. 20 without an isolation power transformer, an isolation power transformer can be inserted between the junctions of the windings 500 with the lines 351–353 and the utility system grid, not shown.

Figure 21:
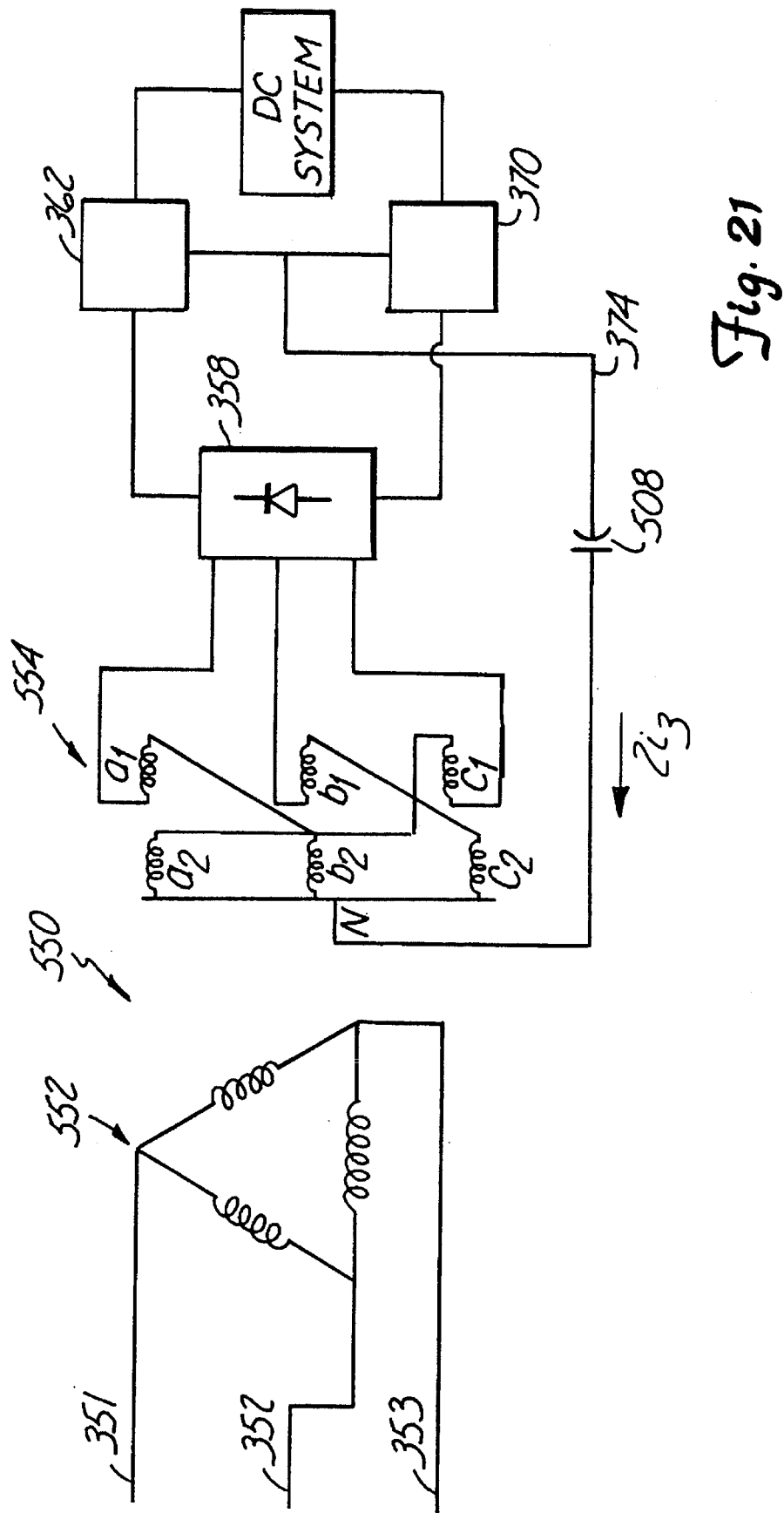
FIG. 21 is a schematic representation of another embodiment of the present invention as applied to reducing harmonic distortion between a utility system and an DC system.

FIG. 21 illustrates yet another embodiment of the present invention. In FIG. 21, an isolation transformer 550 is connected to lines 351, 352 and 353 between the utility system grid, not shown, and the power converter 358. The isolation transformer 550 includes a delta connected primary winding 552 and a secondary winding 554 connected in a zigzag configuration. Although illustrated with the delta connected primary winding 552, the isolation transformer 550 could also be connected with wye connected primary windings, not shown.

Figure 22:
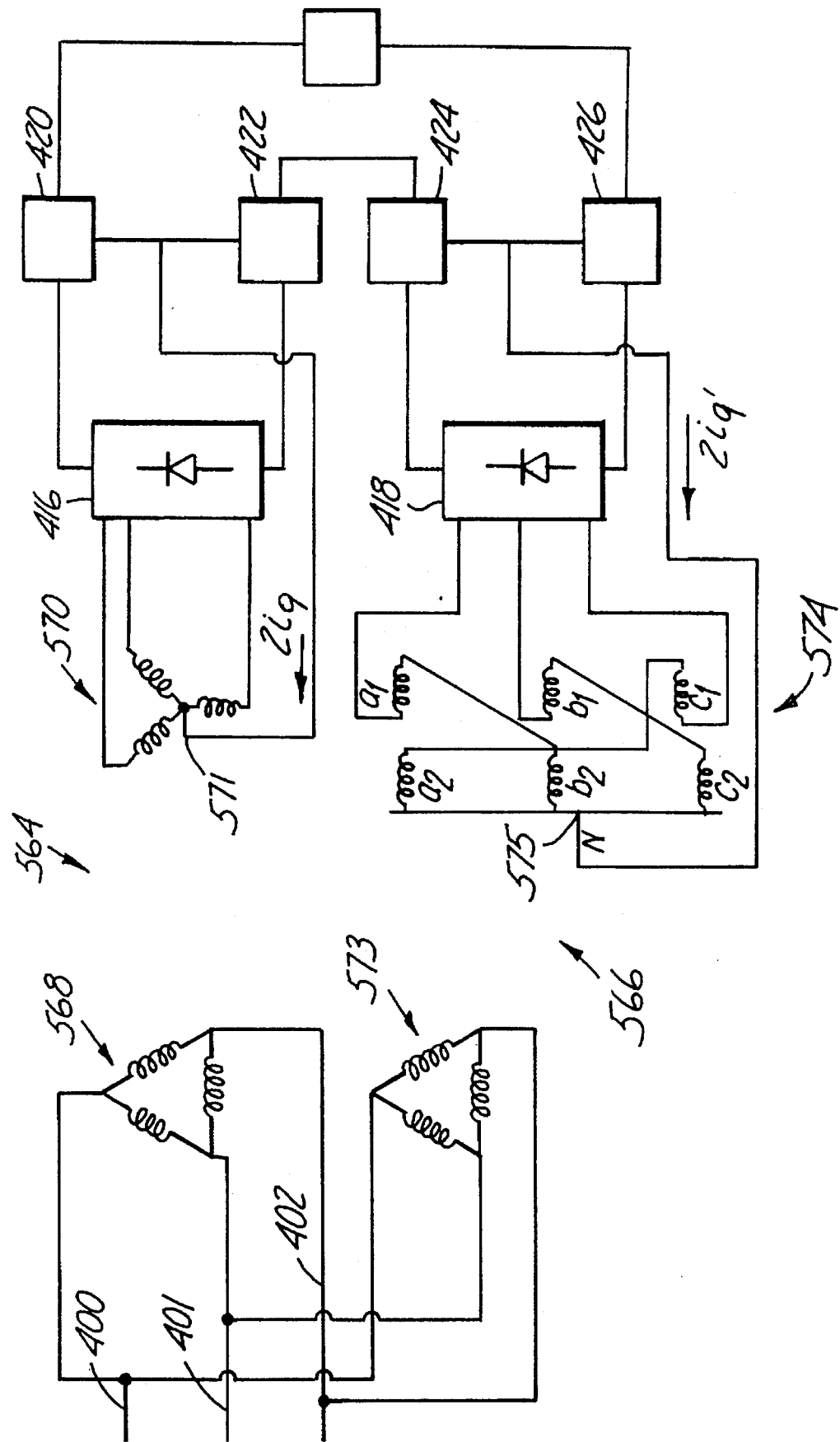
FIG. 22 is a schematic representation of another twelve-pulse embodiment of the present invention as applied to reducing harmonic distortion between a utility system and a DC system.

FIG. 22 illustrates another twelve-pulse system. In FIG. 22, like reference numbers are used to indicate like elements or components as illustrated in FIG. 15. Three-phase power is provided on lines 400, 401 and 402 from a utility system, not shown, to two transformers 564 and 566. Transformer 564 is a delta-wye transformer having a delta connected primary winding 568 and a wye connected secondary winding 570. The delta-wye transformer 564 provides the necessary 30° phase shift needed for twelve-pulse operation. The transformer 564 can be constructed either from three single phase transformers properly connected, or alternatively, a single 3-phase transformer. Likewise, the transformer 566 having no substantial phase shift from the delta connected primary windings 573 to the zigzag connected secondary windings 574 could also be formed from three single phase transformers or one 3-phase transformer. Each of the secondary windings 570 and 574 are connected to converters of conventional design designated at 416 and 418, respectively. Each converter 416 and 418 are connected to two boost converter assemblies 420 and 422, and 424 and 426, respectively. Injection current from boost converters 420 and 422 is injected into a neutral 571 of the secondary windings 570, while injection current from boost converter assemblies 424 and 426 is injected into a neutral 575 of the secondary winding 574.

Figure 23:
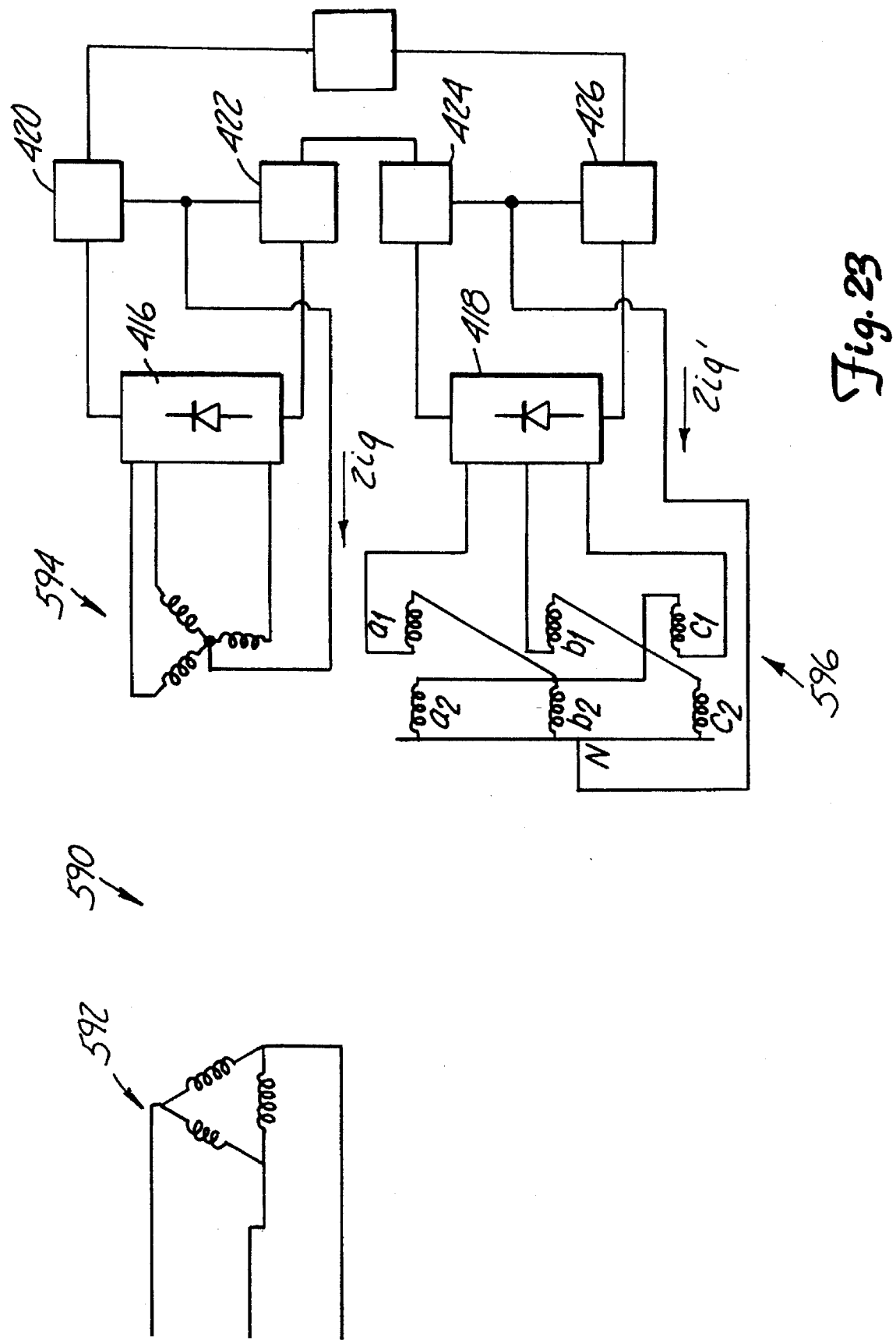
FIG. 23 is another twelve-pulse embodiment of the present invention as applied to reducing harmonic distortion between a utility system and a DC system.

FIG. 23 illustrates yet another embodiment of a twelve-pulse system. In FIG. 23, a single isolation transformer 590 having a delta connected primary winding 592 and two secondary windings 594 and 596. Secondary winding 594 is wye connected and receives the injection current from boost converter assemblies 420 and 422, while secondary winding 596 is connected in a zigzag configuration and receives injection current from boost converter assemblies 424 and 426.

Figure 24:
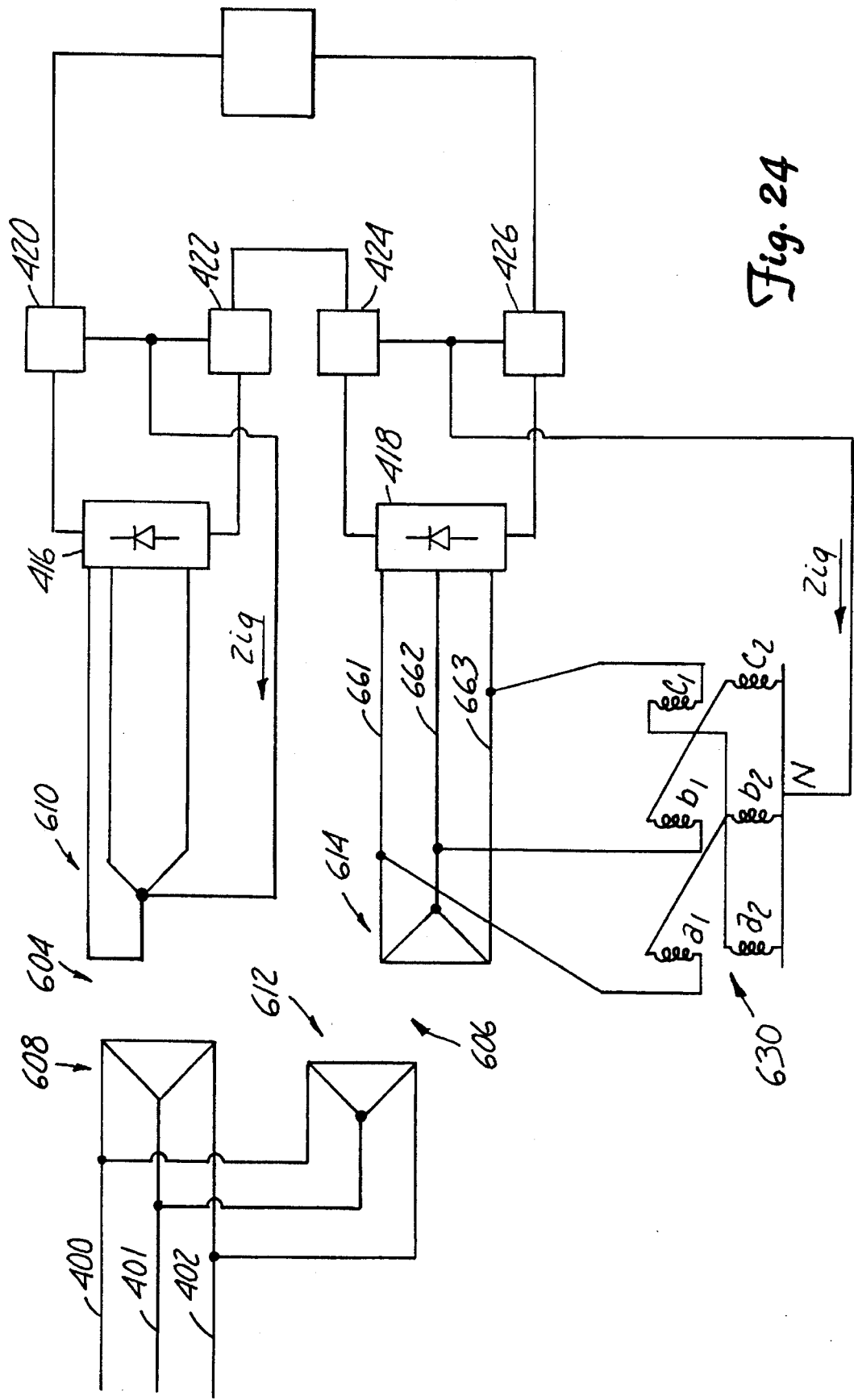
FIG. 24 is a schematic representation of another twelve-pulse embodiment of the present invention as applied to reducing harmonic distortion between a utility system and a DC system.

FIG. 24 illustrates another twelve-pulse system. Three-phase power provided on lines 400, 401 and 402 from a utility system, not shown, is connected to two transformers 604 and 606. Transformer 604 is a delta to wye transformer having a delta connected primary winding 608 and a wye connected secondary winding 610. The delta-wye transformer 604 provides the necessary 30° phase shift needed for twelve-pulse operation. The transformer 604 can be constructed either from three single-phase transformers properly connected, or alternatively, a single 3-phase transformer. Likewise, the transformer 606 having no substantial phase shift from the delta connected primary winding 612 to the delta connected secondary winding 614 could also be formed from three single phase transformers or one 3-phase transformer. Injection current from boost converter assemblies 420 and 422 is provided to the neutral of the secondary transformer section 610, while injection current from boost converters 424 and 426 is provided to the neutral of a zigzag transformer 630. The zigzag transformer 630 divides the injected harmonic current to lines 661, 662 and 663 equally from the neutral. In addition, the isolated transformers 604 and 606 could be replaced with a single transformer, not shown, having a delta connected primary winding and two secondary windings wherein one of the secondary windings is wye connected and the other is delta connected.

Although illustrated in FIGS. 21–24 where the boost converter assemblies 420,422,424 and 426 are connected in series, it is to be understood that the boost converters could also be connected in parallel as shown in FIG. 16.

Although many of the embodiments described above use converters to transform AC power to DC power, it is to be understood that these converters could be replaced with inverters to transform DC power-to AC power, or with bidirectional converters such as illustrated at FIG. 7 at 170 to allow bidirectional power flow.

The present invention must provide sinusoidal currents in a three-phase utility interface. The most common application is in the form of the invention as shown in FIG. 2 where a three-phase utility voltage is rectified into a DC voltage using diode-bridge rectifiers. However, the arrangement is useful for DC to AC inversion, where power flows from the DC side of the converter into a utility, and in battery storage circuits where power flow must be bidirectional. Regulated DC bus voltage is obtained with the present system, and because there is no need for having large inductors in order to obtain a pure DC current, costs are reduced, while the advantage of a regulated DC voltage is obtained. No isolation transformer between the utility and the DC system is required with the present invention, although if such an isolation transformer is needed for other reasons, the current developed can be injected into the center tap or neutral of the secondary of the transformer. Otherwise, a coupling device for injecting current into each of the individual phase lines is used.

The device is low cost, with high energy efficiency and low power losses. Operation causes very low electromagnetic interference, and the switching frequency does not have to be excessively high.

Although the present invention has been described with reference to preferred embodiments, workers skilled in the art will recognize that changes may be made in form and detail without departing from the spirit and scope of the invention.

What is claimed is:

1. A harmonic reducing system for reducing harmonic currents generated from power conversion means connected between a multiphase alternating current power system having a base fundamental frequency and a direct current power system having terminals carrying a direct current, said power conversion means operating at the base fundamental frequency, said harmonic reducing system comprising:

current modulating means connected between said direct current power system and said power conversion means, said current modulating means being connected to receive at least a portion of the direct current carried through the terminals and modulating said at least a portion of the direct current with first and second superimposed sinusoidal currents at a selected harmonic frequency of the fundamental frequency greater than the fundamental frequency, wherein the first and second superimposed sinusoidal currents have an amplitude proportional to the direct current to reduce the selected harmonic currents; and means connected to the current modulating means for combining said first and second superimposed currents to form a sinusoidal injection current at the selected harmonic frequency, said injection current having an amplitude substantially equal to twice the amplitude of the first superimposed sinusoidal current; and coupling means connected between said means for combining and said multiphase alternating current power system for injecting a portion of said injection current through said coupling means into each phase of the multiphase alternating current system, the coupling means including a set of windings connected in a zigzag arrangement having a neutral connected to the means for combining for receiving the injection current.

2. The harmonic reducing system of claim 1 wherein the selected frequency includes the third harmonic frequency.

3. The harmonic reducing system of claim 1 wherein the current modulating means regulates a voltage across the terminals of the direct current power system.

4. The harmonic reducing system of claim 1 wherein the power conversion means comprise an inverter to transfer power from the direct current power system to the multiphase alternating current power system.

5. The harmonic reducing system of claim 1 wherein the coupling means includes a second set of windings connected in a wye arrangement.

6. The harmonic reducing system of claim 1 wherein the power conversion means comprise a rectifier to transfer power from the multiphase alternating current power system to the direct current power system.

7. The harmonic reducing system of claim 1 wherein the coupling means comprises a transformer having primary windings connected to the multiphase alternating current power system and secondary windings connected to the power conversion means, the set of windings being connected to the secondary windings.

8. The harmonic reducing system of claim 1 wherein the coupling means further includes a capacitor connected between the neutral of the set of windings and the means for combining.

9. The harmonic reducing system of claim 1 and further comprising;

second power conversion means connected between the multiphase alternating current power system and the direct current power system;

second current modulating means connected between said direct current power system and said second power conversion means, said second current modulating means being connected to receive at least a second portion of the direct current carried through the terminals and modulating said at least a second portion of the direct current with third and fourth superimposed sinusoidal currents at a selected harmonic frequency of the fundamental frequency greater than the fundamental frequency, wherein the third and fourth superimposed sinusoidal currents have an amplitude proportional to the direct current to reduce the selected harmonic currents; and second combining means connected to the second current modulating means for combining said third and fourth superimposed currents to form a second sinusoidal injection current at the selected harmonic frequency, said second injection current having an amplitude substantially equal to twice the amplitude of the third superimposed current; and second coupling means connected between said second combining means and said multiphase alternating current power system for injecting a portion of said second injection current through said second coupling means into each phase of the multiphase alternating current system.

10. The harmonic system of claim 9 wherein the second coupling means includes a second set of windings having a second neutral connected to the second combining means and receiving the second injection current.

11. The harmonic reducing system of claim 9, wherein each current modulating means comprises a first current shaping modulator and a second current shaping modulator connected to the direct current power system, and wherein the first mentioned means for combining comprises a first junction point connected between the first and second current shaping modulators of the first-mentioned current modulating means, the first-mentioned coupling means being connected to the first-mentioned current modulating means at the first junction point; and wherein the second combining means comprises a second junction point connected between the first and second current shaping modulators of the second current modulating means, the second coupling means being connected to the second current modulating means at the second junction point.

12. The harmonic reducing system of claim 9 wherein the selected frequency includes the ninth harmonic frequency.

13. The harmonic reducing system of claim 11 wherein the terminals comprise a first terminal and a second terminal and wherein each of the first current shaping modulators are connected to the first terminal and wherein each of the second current shaping modulators are connected to the second terminal.

14. The harmonic reducing system of claim 11 wherein the terminals comprise a first terminal and a second terminal and wherein the first current shaping modulator of the first-mentioned current modulating means is connected to the first terminal, the second current shaping modulator of the first-mentioned current modulating means is connected to the first current shaping modulator of the second current modulating means, and the second current shaping modulator of the second current modulating means is connected to the second terminal.

15. The harmonic reducing system of claim 1 wherein the coupling means comprises a transformer being primary windings connected to the multiphase alternating current power system and the set of windings are secondary windings and are connected to the power conversion means.

16. The harmonic reducing system of claim 15 wherein the primary windings comprise delta connected windings.

17. A harmonic reducing system for reducing harmonic currents generated from power conversion means connected between a multiphase alternating current power system having a base fundamental frequency and a direct current power system having terminals carrying a direct current, said power conversion means operating at the base fundamental frequency, said harmonic reducing system comprising:

current modulating means connected between said direct current power system and said power conversion means, said current modulating means being connected to receive the direct current carried through the terminals and modulating said at least a portion of the direct current with first and second superimposed sinusoidal currents at a selected harmonic frequency of the fundamental frequency greater than the fundamental frequency wherein the first and second superimposed sinusoidal currents have an amplitude proportional to the direct current to reduce the selected harmonic currents; and means connected to the current modulating means for combining said first and second superimposed currents to form a sinusoidal injection current at the selected harmonic frequency, said injection current having am amplitude substantially equal to twice the amplitude of each sinusoidal current; and coupling means connected between said means for combining and said multiphase alternating current power system for injecting a portion of said injection current through said coupling means into each phase of the multiphase alternating current system, the coupling means comprising:

magnetic core means forming a closed magnetic path;

a plurality of windings wound around a portion of the magnetic core means, wherein a first end of each winding is connected to a phase of the AC system; and connection means for connecting a second end of each winding to form a common junction, the common junction receiving the injection current.

18. A harmonic reducing system for reducing selected harmonic currents generated from power conversion means connected between a multiphase alternating current power system having a base fundamental frequency and a direct current power system having terminals carrying a direct current, said harmonic reducing system comprising:

first current modulating means connected between said direct current power system and said power conversion means, said current modulating means being connected to receive at least a portion of the direct current carried through the terminals and modulating said at least a portion of the direct current with first and second superimposed sinusoidal currents at a selected harmonic frequency of the fundamental frequency, wherein the first and second superimposed sinusoidal currents have an amplitude proportional to the direct current to reduce the selected harmonic currents; and first combining means connected to the first current modulating means for combining said first and second superimposed currents to form a first sinusoidal injection current at the selected harmonic frequency, said first injection current having an amplitude substantially equal to twice the amplitude of the first superimposed sinusoidal current;

first coupling means connected between said means for combining and said multiphase alternating current power system for injecting a portion of said injection current through said coupling means into each phase of the multiphase alternating current system, the coupling means including a transformer having wye-connected windings with a neutral connected to the first combining means for receiving the injection current;

second power conversion means connected between the multiphase alternating current power system the direct current power system;

second current modulating means connected between said direct current power system and said second power conversion means, said second current modulating means being connected to receive at least a second portion of the direct current carried through the terminals and modulating a third and fourth superimposed sinusoidal currents with the second portion of the direct current at a selected harmonic frequency of the fundamental frequency, wherein the third and fourth superimposed sinusoidal currents have an amplitude proportional to the direct current to reduce the selected harmonic currents;

second combining means connected to the second current modulating means for combining said third and fourth superimposed currents to form a second sinusoidal injection current at the selected harmonic frequency, said second injection current having an amplitude substantially equal to twice the amplitude of the third superimposed current; and second coupling means connected between said second combining means and said multiphase alternating current power system for injecting a portion of said second injection current through said second coupling means into each phase of the multiphase alternating current system, the second coupling means including a second transformer having wye-connected windings with a second neutral connected to the second combining means for receiving the second injection current.

19. The harmonic reducing system of claim 18 wherein each current modulating means comprises a first current shaping modulator and a second current shaping modulator connected to the direct current power system, and wherein the first combining means comprises a first junction point connected between the first and second current shaping modulators of the first current modulating means, the first coupling means being connected to the first current modulating means at the first junction point; and wherein the second combining means comprises a second junction point connected between the first and second current shaping modulators of the second current modulating means, the second coupling means being connected to the second current modulating means at the second junction point.

20. The harmonic reducing system of claim 19 wherein the terminals comprise a first terminal and a second terminal and wherein each of the first current shaping modulators are connected to the first terminal and wherein each of the second current shaping modulators are connected to the second terminal.

21. The harmonic reducing system of claim 19 wherein the terminals comprise a first terminal and a second terminal and wherein the first current shaping modulator of the first current modulating means is connected to the first terminal, the second current shaping modulator of the first current modulating means is cormsated to the first current shaping modulator of the second current modulating means, and the second current shaping modulator of the second current modulating means is connected to the second terminal.

22. The harmonic reducing system of claim 18 wherein the selected frequency includes the ninth harmonic frequency.

* * * * *

UNITED STATES PATENT AND TRADEMARK OFFICE
CERTIFICATE OF CORRECTION

PATENT NO. : 5,499,178
DATED : March 12, 1996
INVENTOR(S) : Ned Mohan

It is certified that error appears in the above-indentified patent and that said Letters Patent is hereby corrected as shown below:

Column 22, line 50, replace "being" with --having--.

Column 24, line 56, replace "cormsated" with --connected--.

Signed and Sealed this

Fourth Day of February, 1997

Attest:

BRUCE LEHMAN

*Attesting Officer*  *Commissioner of Patents and Trademarks*